United States Patent [19]
Wakabayashi et al.

[11] Patent Number: 5,937,213
[45] Date of Patent: *Aug. 10, 1999

[54] CAMERA HAVING SCALE IMPRINTABLE CAPABILITIES AND METHOD FOR IMPRINTING THE SCALE

[75] Inventors: Hiroshi Wakabayashi, Yokohama; Hiroshi Terunuma, Chiba-ken; Hidenori Miyamoto, Urayasu; Hideya Inoue, Kanagawa; Toshiyuki Nakamura, Tokyo; Tatsuo Amanuma, Ageo; Yoshikazu Iida, Chigasaki; Yoshihiro Takeuchi, Tokyo, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,041

[22] Filed: Mar. 28, 1997

Related U.S. Application Data

[63] Continuation of application No. 08/330,693, Oct. 29, 1994, abandoned, which is a continuation-in-part of application No. 08/281,692, Jul. 28, 1994, abandoned, which is a continuation of application No. 08/141,980, Oct. 28, 1993, abandoned.

[30] Foreign Application Priority Data

Oct. 28, 1992 [JP] Japan ................................. 4-290315
Oct. 26, 1993 [JP] Japan ................................. 5-267146
Apr. 28, 1994 [JP] Japan ................................. 6-092632

[51] Int. Cl.$^6$ .................................................. G03B 17/24
[52] U.S. Cl. ............................... 396/50; 396/70; 396/80; 396/88; 396/266; 396/315
[58] Field of Search .................................. 348/135–138; 396/50, 79, 88, 310, 311, 315, 263, 266, 65, 70, 121–123, 147, 80

[56] References Cited

U.S. PATENT DOCUMENTS

| | | |
|---|---|---|
| 2,282,680 | 5/1942 | Sonne . |
| 2,705,319 | 3/1955 | Dauber . |
| 3,102,459 | 9/1963 | Zimberoff . |
| 3,902,182 | 8/1975 | Hillborg . |
| 4,183,645 | 1/1980 | Ohmura et al. ........................ 354/106 |
| 4,716,429 | 12/1987 | Misawa ................................... 354/409 |
| 4,728,978 | 3/1988 | Inoue et al. ......................... 354/289.1 |
| 4,751,546 | 6/1988 | Yamamoto et al. ............... 354/106 X |
| 4,943,824 | 7/1990 | Nabeshima et al. .................... 354/403 |
| 5,331,419 | 7/1994 | Yamoda et al. ..................... 348/137 X |
| 5,392,091 | 2/1995 | Iwasaki .................................. 354/432 |

*Primary Examiner*—W. B. Perkey

[57] ABSTRACT

A camera, such as a video camera or other electrically recordable camera, has scale imprintable capabilities and a method for imprinting a scale onto memory storage media. The camera and method imprints, optically or electrically, a standard scale on memory storage media for the purpose of estimating the size of a subject image. A photographic magnification calculation circuit calculates the photographic magnification based on a subject distance, and a reference scale setting circuit sets a reference scale for the purpose of estimating the size of the subject image on the memory storage media regardless of the magnification during picture taking or print size. An imprinting circuit imprints, optically or electrically, the reference scale onto the memory storage media in accordance with the reference scale setting circuit, and only when needed or wanted. The reference scale can be imprinted in a vertical or horizontal direction in accordance with a mode selection switch. In addition, date, time and other information can also be imprinted onto the memory storage media. Picture taking will not be performed when it is not possible to accurately superimpose the reference scale and warning displays are generated.

33 Claims, 20 Drawing Sheets

← FILM FORWARDING DIRECTION

FIG. 7

TABLE OF UNITS AND SCALES

| MAGNIFICATION RANGE | UNIT | SCALE LENGTH (mm) | NUMBER OF PULSES | ACTUAL LENGTH ON THE NEGATIVE L(mm) |
|---|---|---|---|---|
| $X \leqq 1/5$ | IMPRINTING INHIBITED | — | — | — |
| $1/5 < X \leqq 1/10$ | 10 cm | 100 X | 100 XP | 10 ~ 20 |
| $1/10 < X \leqq 1/25$ | 20 cm | 200 X | 200 XP | 8 ~ 20 |
| $1/25 < X \leqq 1/50$ | 50 cm | 500 X | 500 XP | 10 ~ 20 |
| $1/50 < X \leqq 1/100$ | 1.0 m | 1000 X | 1000 XP | 10 ~ 20 |
| $1/100 < X$ | IMPRINTING INHIBITED | — | — | — |

FIG. 19

| f mm | 5 cm | 10 cm | 20 cm | 30 cm | 40 cm | 50 cm | 1 m |
|---|---|---|---|---|---|---|---|
| 38mm | 0.75m ≦ ≦0.98m | 0.98m < ≦1.85m | 1.85m < ≦2.71m | 2.71m < ≦3.41m | / | / | / |
| 70mm | / | 0.75m ≦ ≦1.29m | 1.29m < ≦1.89m | 1.89m < ≦2.47m | 2.47m < ≦3.05m | 3.05m < ≦3.41m | / |
| 105mm | / | / | 0.75m < ≦1.05m | 1.05m < ≦1.38m | 1.38m < ≦2.70m | 2.70m < ≦3.30m | 3.37m < ≦3.41m |

MAGNIFICATION : $B = f/D - f$
SCALE LENGTH : $L = B \times$ SCALE UNITS
NUMBER OF IMPRINTING ILLUMINATIONS : $N = L/n$
D : OBJECT DISTANCE
f : FOCAL LENGTH OF PICTURE TAKING LENS
n : NUMBER OF PULSES GENERATED PER UNIT LENGTH IN CONJUNCTION WITH FILM FEED

CAMERA HAVING SCALE IMPRINTABLE CAPABILITIES AND METHOD FOR IMPRINTING THE SCALE

This application is a continuation of application Ser. No. 08/330,693, filed Oct. 29, 1994, now abandoned, which is a continuation-in-part application of Ser. No. 08/281,692, filed Jul. 28, 1994, now abandoned, which is a continuation of application Ser. No. 08/141,980, filed Oct. 28, 1993, now abandoned.

BACKGROUND OF THE INVENTION

1. Field of the Invention

The present invention relates to a scale imprintable camera. More particularly, the present invention relates to any type of camera, for example, a still camera, video camera, or any electrically recordable camera, by which a reference scale can be superimposed and imprinted onto memory storage media, including, for example, photographic film, magnetic discs, magnetic tape, or any semiconductor memory, to estimate the size of a subject.

2. Description of the Related Art

Cameras are known in which a stepwise object distance is selectable and a photographic magnification which corresponds to a selected object distance is superimposed and imprinted on a photographic image surface. In this type of camera, the photographic magnification is recorded with predetermined magnifications, such as $\frac{1}{8}$ or $\frac{1}{12}$, etc., corresponding to the selected object distance. When an object distance is selected, the corresponding photographic magnification characters are imprinted in a corner of the photographic picture surface.

Nevertheless, in prior art cameras, the predetermined photographic magnification characters are imprinted only when the photographic magnification is previously selected. A problem arises in that the photographic magnification characters cannot be imprinted at a variable magnification (e.g., a magnification which does not correspond to one of the predetermined characters). Further, as discussed in Japanese Patent Publication HEI4-323506, conventional cameras which superimpose and imprint a reference scale onto a recording medium issue a warning and take a picture without superimposing the reference scale when the distance to the subject is above a specified value since the error in the reference scale is too large. A problem arises when a warning is issued when the distance to the subject is above a specified value but the photographer overlooks the warning and takes the picture not realizing the reference scale is not being superimposed and imprinted.

In addition to the difficulty of intuitively estimating the actual size of the subject from the size of the object image and the imprinted magnification on the film, there is a problem that the imprinted magnification is the photographic magnification for the subject image on the negative. When enlargement is performed during printing, the photographic magnification is changed and the actual size of the subject cannot be easily calculated from the imprinted photographic magnification.

SUMMARY OF THE INVENTION

It is an object of the present invention to imprint, optically or electrically, a reference scale onto memory storage media for the purpose of easily estimating the size of the subject image.

It is another object of the present invention to imprint a reference scale automatically onto memory storage media.

It is yet another object of the present invention to input both a vertical and horizontal reference scale onto memory storage media.

It is still another object of the present invention to imprint a reference scale according to the intentions of the photographer, even if a scale imprinting button is inadvertently pressed during a picture taking operation.

It is yet another object of the present invention to imprint a reference scale only when desired.

To achieve the above-mentioned objects of the present invention, there is provided a camera which includes a photographic magnification calculation circuit for calculating the photographic magnification based on the subject distance, and a reference scale setting circuit for setting a reference scale for estimating the size of the subject image on the film in proportion to the photographic magnification calculated by the photographic magnification calculation circuit. An imprinting circuit imprints, optically or electrically, the reference scale set by the reference scale setting circuit onto the memory storage media.

As embodied herein, the reference scale includes scale graduations and units of length. Further, the subject distance is selected by selecting a focus detection area from among results of a plurality of focus detection areas arranged in the photographic image surface based on the focus result of the focus detection area.

As embodied herein, the camera further includes a selection unit which selects whether or not to superimpose and input the reference scale and a suppressing unit which suppresses the superimposing and imprinting of the reference scale by the imprinting unit when the selection unit selects to cancel the superimposing and imprinting of the reference scale.

As embodied herein, the camera further includes a mode selection switch for cyclically switching between various modes regarding the location of the reference scale and a camera position sensor for automatically sensing the position of the camera to automatically imprint a vertical or horizontal reference scale according to the position of the camera.

As embodied herein, the camera further includes a rangefinding unit which measures subject distance, a focal length detection unit which detects the focal length of a picture taking lens, a photographic magnification calculation unit which calculates a magnification based on the aforementioned subject distance and the aforementioned focal length, a reference scale setting unit which sets the reference scale for estimating the size of the subject image on the film according to the magnification computed by the photographic magnification calculation unit, a superimposing and imprinting unit which superimposes and imprints the reference scale set by the reference scale setting unit, onto the film, and a control unit which controls the picture taking operation and suppresses the picture taking operation according to a subject distance.

BRIEF DESCRIPTION OF THE DRAWINGS

The accompanying drawings illustrate several aspects of the present invention, and together with the description serve to explain the principles of the invention. In the drawings:

FIG. 7 is a table of units and scales employed in embodiments of the present invention;

FIG. 19 is a table for selecting reference scale units;

DESCRIPTION OF THE PREFERRED EMBODIMENTS

Figure 1A:
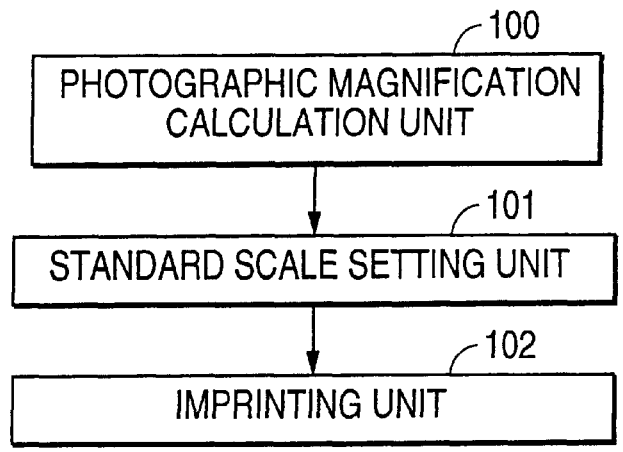
FIGS. 1A and 1B are basic block diagrams of a circuit in a camera for imprinting a reference scale onto memory storage media according to an embodiment of the present invention.

Reference will now be made in detail to the present preferred embodiments of the invention, examples of which are illustrated in the accompanying drawings. Like reference numerals refer to like elements throughout.

The present invention is directed to a camera, such as a still camera, video camera or any electrically recordable camera, in which a reference scale is set in proportion to a photographic magnification. The reference scale is imprinted, electrically or optically, onto memory storage media, for example, film. This allows the size of the subject image imprinted on the film to be easily estimated. When superimposing and imprinting, the reference scale is not desired then the suppression circuit is selected by a mode selection switch.

FIG. 1A is a basic block diagram of a circuit in a camera for imprinting a reference scale onto film according to an embodiment of the present invention. The circuit includes a photographic magnification calculation unit 100 for calculating a photographic magnification based on the distance of the subject from the camera, a reference scale setting unit 101 for setting a reference scale for estimating the size of the photographed subject on the film, and an imprinting unit 102 for imprinting the reference scale, set by the reference scale setting unit 101, onto the film.

Figure 1B:
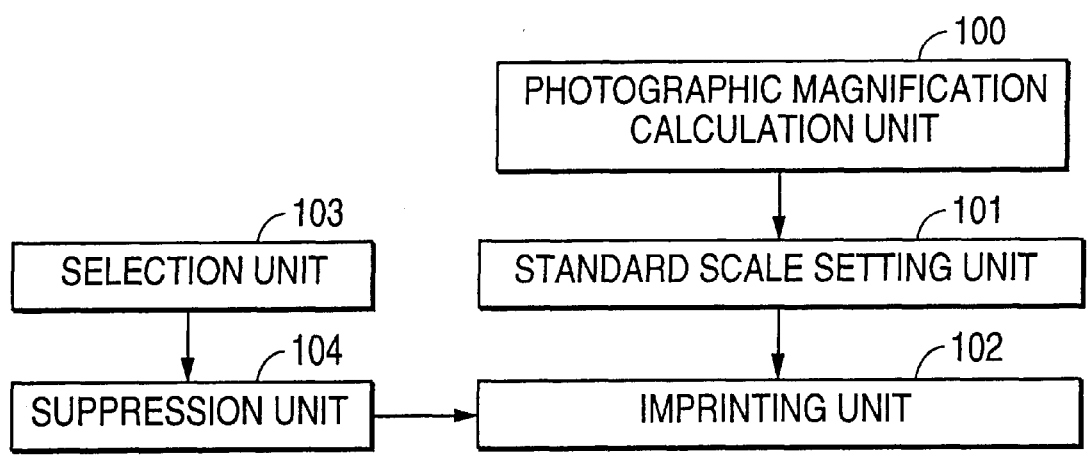

FIG. 1B is a basic block diagram of a circuit in a camera for imprinting a reference scale onto film as shown in FIG. 1A and further includes a selection unit 103 for selecting whether or not to superimpose and imprint the reference scale onto the film and a suppression unit 104 which suppresses the superimposing and imprinting of the reference scale by the imprinting unit 102 when the selection unit cancels the superimposing and imprinting of the reference scale.

Figure 2:
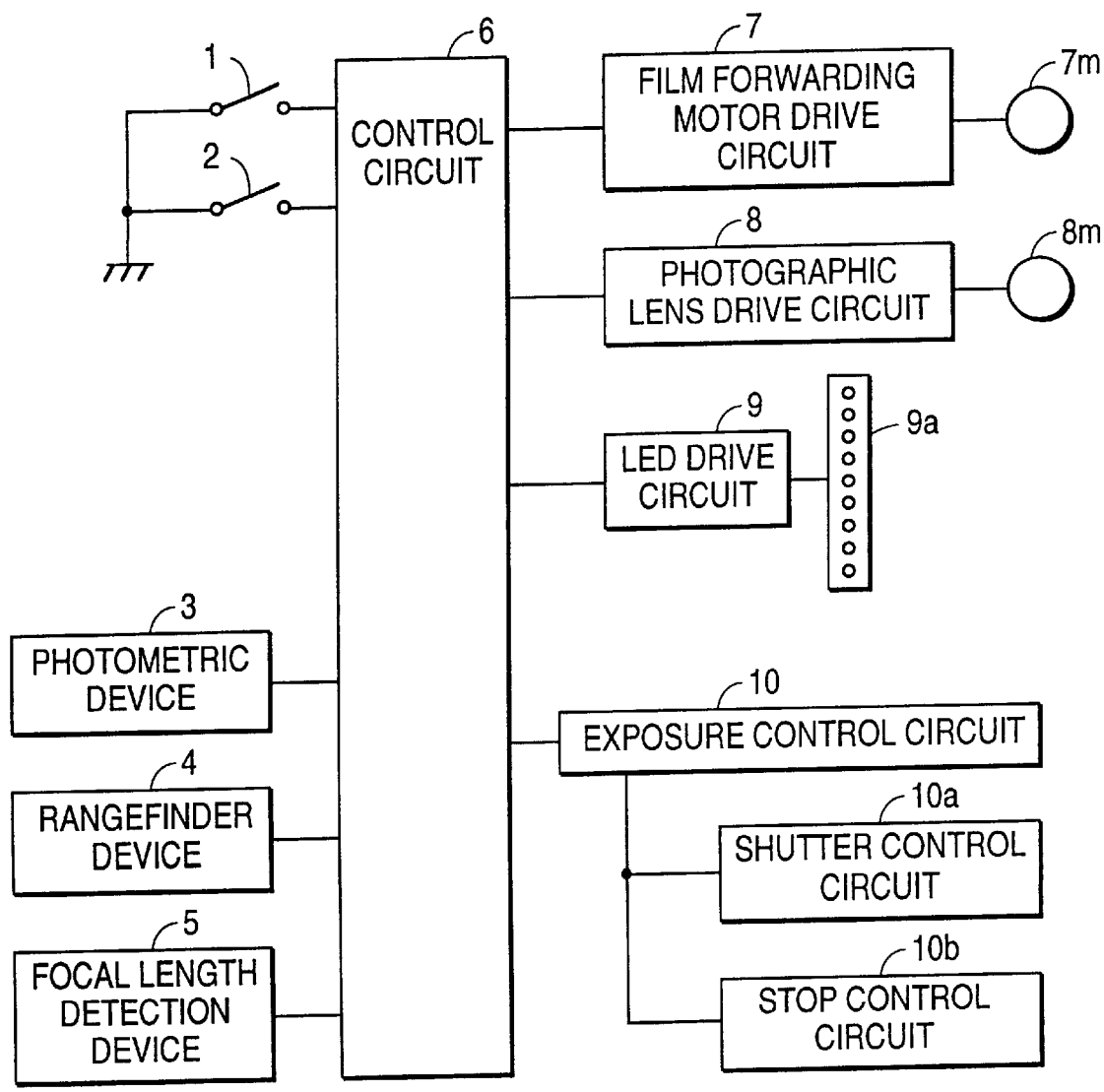
FIG. 2 is a detailed block diagram of the circuit in FIGS. 1A and 1B according to a first embodiment of the present invention.

FIG. 2 is a detailed block diagram of the camera circuits and devices according to a first embodiment of the present invention. In FIG. 2, switch 1 is a half depression switch which is turned ON when a release button, not shown in the drawing, is depressed halfway. This prepares the camera for operation by actuating a light metering operation, brightness of the object field operation and various other operations. A switch 2 is a full depression switch which is turned ON when the release button is fully depressed to enable the camera to perform a photographic operation. A photometric device 3 measures the light in the subject field to detect a subject brightness. A rangefinder device 4 performs rangefinding at plural focus detection areas arranged within the photographic image surface and, based on a focus detection result of whichever focus detection area is selected and detects the subject distance D (mm). The construction of the photometric device 3, the rangefinder device 4 and the rangefinding method are not limited by this embodiment example, as other devices and methods can be employed.

A focal length detection device 5 detects the focal length f(mm) of a zoom lens by means of an encoder arranged in the zoom lens. In the case of a zoom lens having an electric motor, an encoder is arranged on the motor and drives the zoom lens, and the drive quantity is detected from a reference position and converts the drive quantity into a focal length f(mm) by methods known and used in the art. A control circuit 6 is formed by a microcomputer. Peripheral components of the control circuit 6 control the sequence of various camera operations. In addition, the control circuit 6 controls the superimposing and imprinting of a reference scale based on the execution of a program as described hereinbelow. A film forwarding motor drive circuit 7 drives a film forwarding motor 7m to wind and rewind the film. A photographic lens drive circuit 8 drives a lens motor 8m according to a lens drive amount and drive direction commands from the control circuit 6 and focuses a photographic lens. An LED drive circuit 9 drives an LED array 9a, which, according to the first embodiment of the present invention, includes nine LEDs. The number of LEDs employed can be more or less than nine depending on the results desired. The more LEDs, the better the quality and clarity of the imprinted characters on the film. The LED drive circuit 9 and the LED array 9a imprint the reference scale or characters onto the film. An exposure control circuit 10 performs exposure of the film by controlling a shutter control circuit 10a and a stop control circuit unit (aperture mechanism) 10b.

Figure 3:
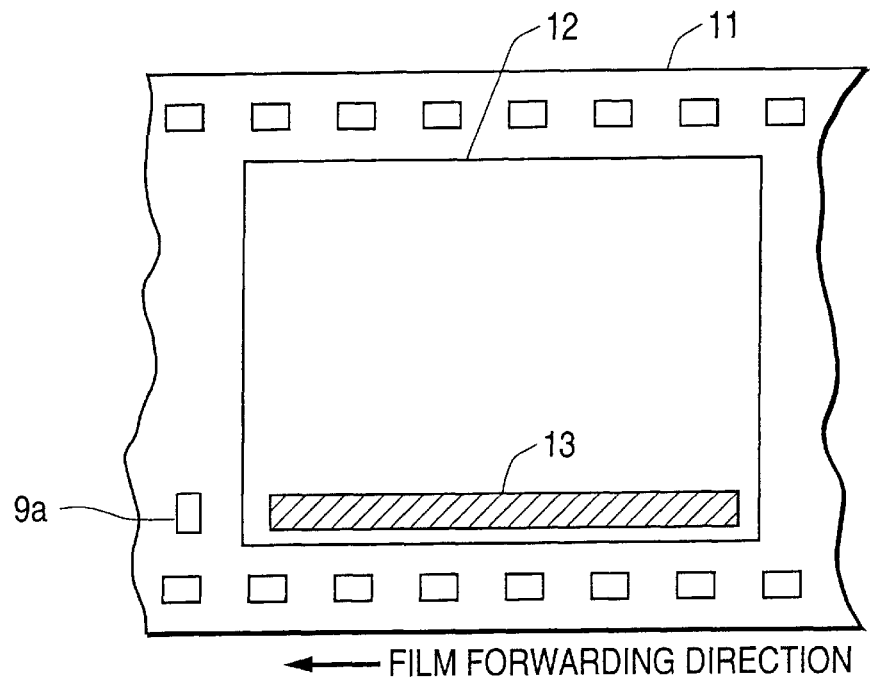
FIG. 3 is a diagram showing the positional relationship of an LED array with respect to a film according to the first embodiment of the present invention.

FIG. 3 is a diagram showing the positional relationship of the LED array 9a with respect to film 11. The LED array 9a, seen from the rear of the camera, is arranged near a bottom portion of the film 11. The LED array 9a can be located at various portions with respect to the film and is not limited to a bottom portion. The reference scale, the date of photography, etc., are imprinted onto an imprinting region 13 located, in this example, at the bottom portion of photographic frame 12, during the film forwarding time after exposing the photographic frame 12. However, the imprinting region 13 can also be located at other portions and is not limited to the above example.

Figure 4:
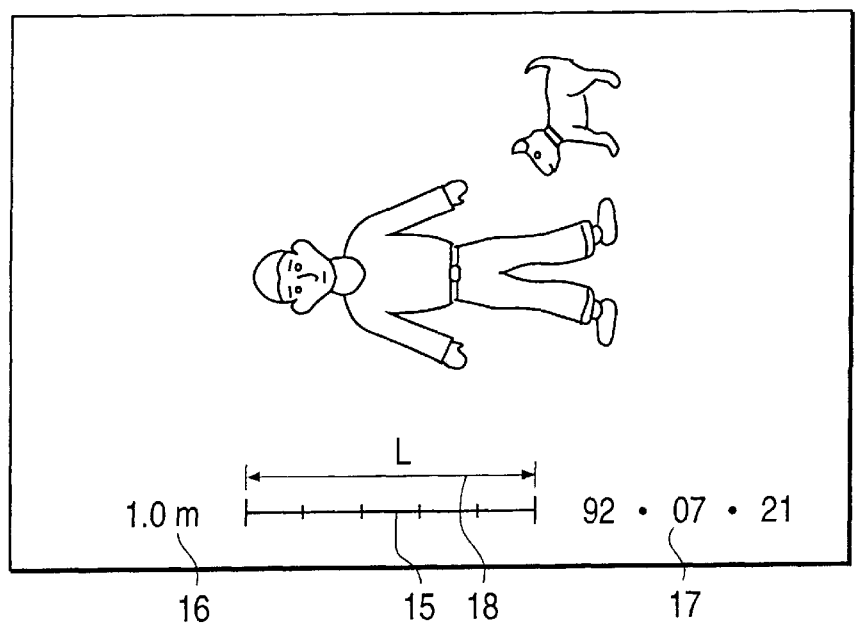
FIGS. 4 and 5 are illustrative photographs showing a reference scale printed on a film according to embodiments of the present invention.
Figure 5:
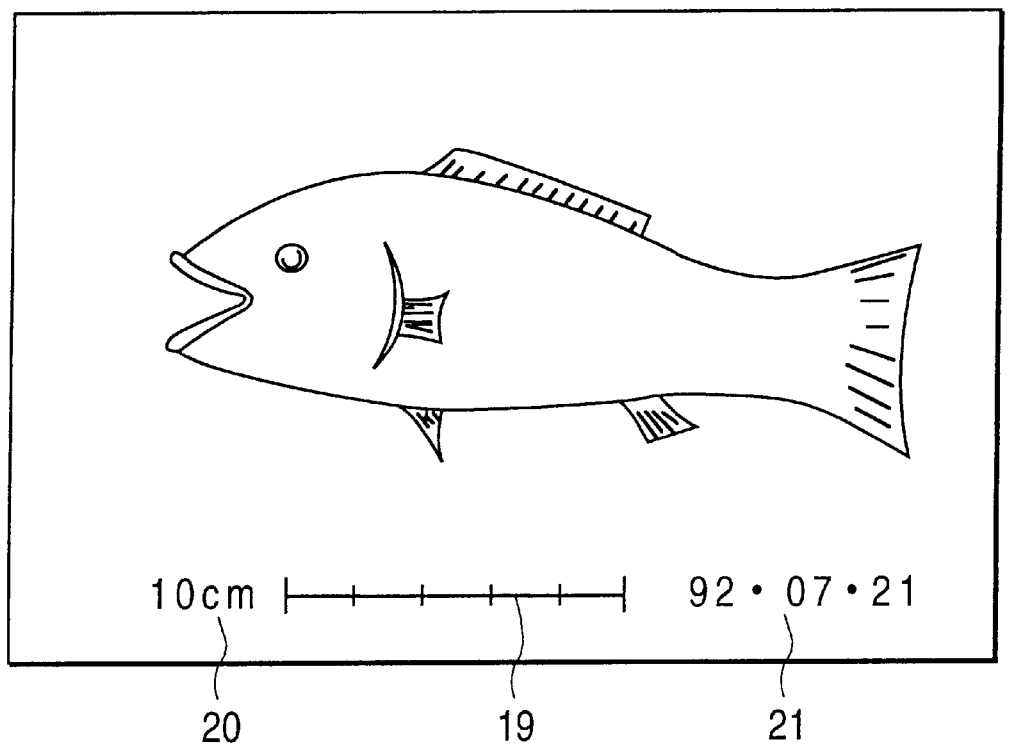

FIGS. 4 and 5 are illustrative photographs onto which the reference scale has been imprinted. FIG. 4 is a photograph of a child and a dog, taken with the camera in a vertical position, and shows an example in which a scale graduation 15, a scale unit 16 and a date 17 are imprinted. The scale graduation 15 and scale unit 16 are provided to estimate the height of the child. The character L and the dimension line 18 show the actual length of the reference scale and are not imprinted on the negative.

FIG. 5 is a photograph of a fish, taken with the camera in a horizontal position, and shows an example in which a scale graduation 19, a scale unit 20 and a date 21 are imprinted. The scale graduation 19 and scale unit 20 estimate the length of the fish.

When the photographic magnification changes because the size of the subject image on the film changes, it is necessary to change the length of the reference scale in proportion to the photographic magnification. For example, in the case in which the photographic magnification is 10 times, the size of the subject image increases 10 times, and the length on which the reference scale is based becomes 10 times longer. However, because this would exceed the length of the side of the photographic frame, the reference scale is represented, as shown in FIGS. 4 and 5, by scale graduations 15 and 19 and scale units 16 and 20 representing length or height. When the photographic magnification is, for example, 10 times, the scale units are made 1/10.

Figure 6A:
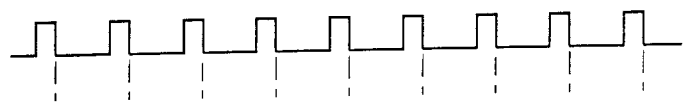
FIGS. 6(a)–6(d) are diagrams for explaining how the reference scale is printed onto a film according to the first embodiment of the present invention.
Figure 21:
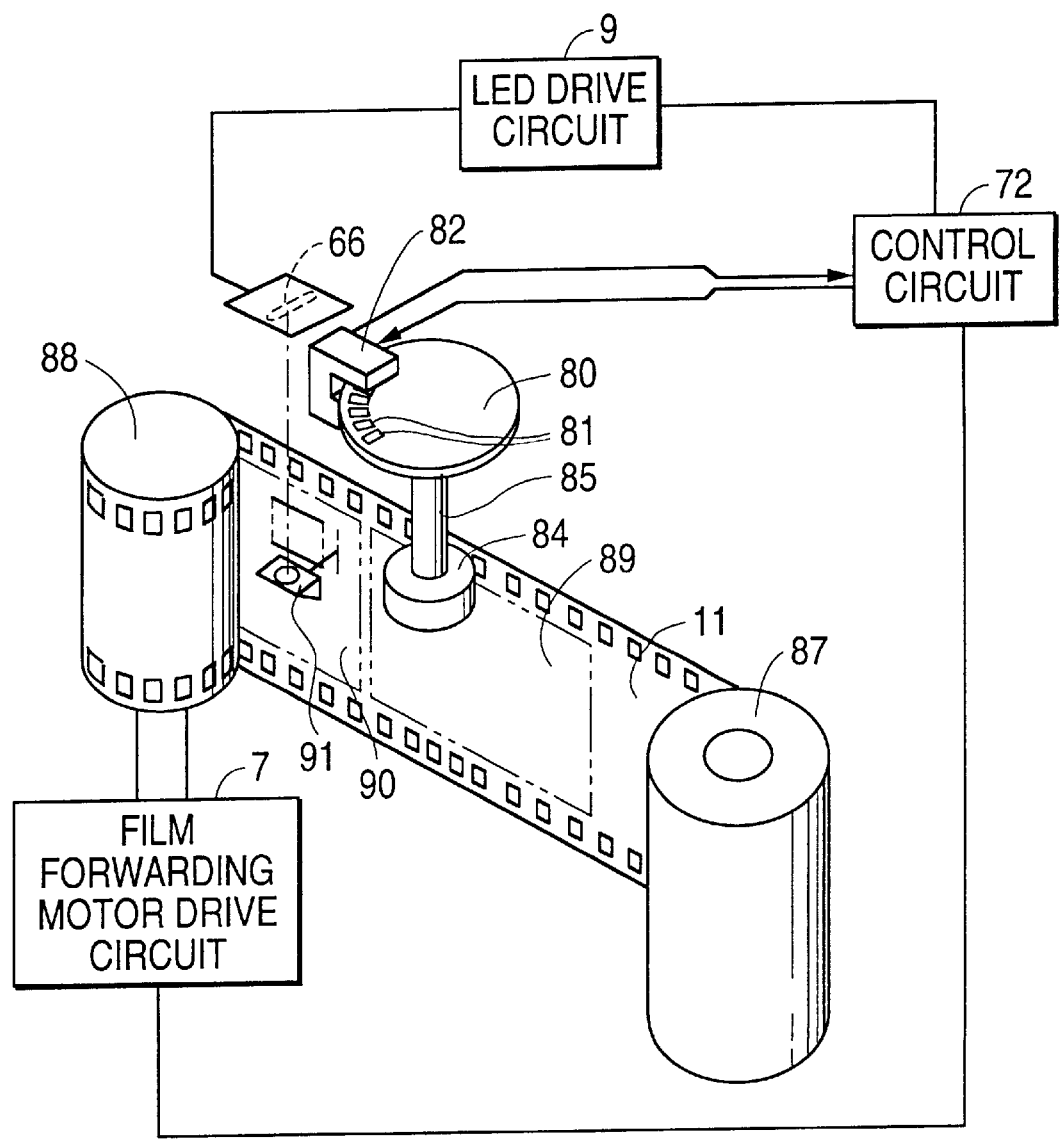
FIG. 21 is a diagram of a film feed pulse generating device according to the present invention.

FIGS. 6(a)–6(d) are diagrams for explaining the imprinting of the reference scale and characters onto the film by the LED array 9a shown in FIG. 2. In FIGS. 6(a)–6(d), the imprinting of the Japanese character for "day"—□—is illustrated. In FIG. 6(a), pulse signals are generated from a slit disc 80 and a photointerrupter 82, which are rotated in connection with a free sprocket 84 during film feed in a film feed pulse generating device shown in FIG. 21. As shown in FIG. 21, when film 11 is wound after exposure of the photographed frame, the free sprocket 84 follows the film 11 and a pulse signal is generated from an encoder which includes the slit disc 80 and the photointerrupter 82. In FIG. 21, one end of the film 11 is held in a film cartridge 87. The other end of the film 11 is wound on a film spool 88. The film forwarding motor drive circuit 7 is connected to the film spool 88. The position of an aperture screen 89, representing the area of film upon which the next photograph will be exposed, is shown as a broken line having two dashes in the center of the film 11. The position of a previous screen 90 is shown as being partly wound on the film spool 88. The slit disk 80 includes a plurality of radial slits 81 in its perimeter. The photointerrupter 82 applies a pulse signal to the control circuit 72 each time one of the radial slits 81 in the slit disk 80 passes between its arms. The radial slits 81 on the slit disk 80 move by way of a free sprocket rod 85 which meshes with the film 11 by way of the free sprocket 84.

After a picture is taken, LEDs in a date mode selection area 66 located above the previous screen 90 are activated in the appropriate pattern and sequence by the LED drive circuit 9. As the film is advanced following the taking of a picture, the light from the LEDs passes through an optical system 91 to impinge on a fixed position on the previous screen 90 as it is advanced past the fixed position. The pattern and timing of energizing signals fed to the LEDs from the LED drive circuit 9 imprint data on the film 11.

Figure 6B:
Figure 6C:
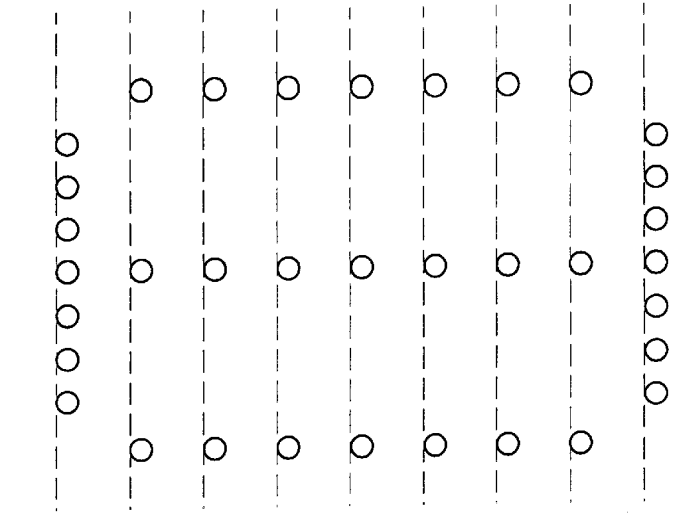
Figure 6D:
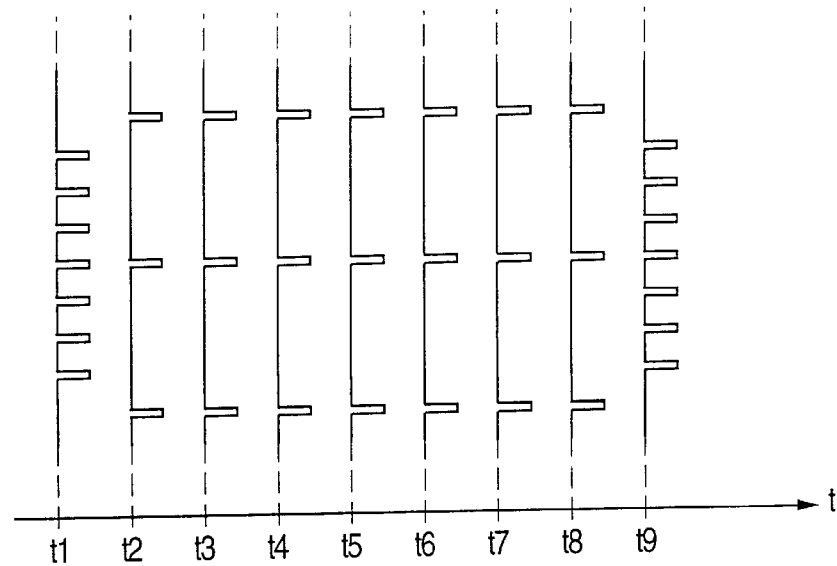

The LED drive circuit 9 forms light timing pulses for the LEDs 9a synchronized with the falling edge of the pulse signals from the encoder as shown in FIG. 6(b). The film is exposed as shown in FIG. 6(c). That is, when the film is forwarded and the LED array 9a reaches the predetermined imprinting position of the imprinting region 13, the light timing pulses from the LED drive circuit 9 at the instant t1 are impressed upon the LEDs in the LED array 9a, excluding the two end LEDs, as shown in FIG. 6(d) and the film is exposed. Then, at the light timings t2 to t8, both end LEDs and the center LED are lit. At the light timing t9, LEDs, excluding the two end LEDs, are again lit. In this manner, the reference scale or characters are imprinted onto the film.

FIG. 7 is a table showing the photographic magnification range X, the units of the reference scale, the length of the reference scale, the total number of pulses when imprinting the reference scale which is equal to the scale length times the number of light timing pulses P per unit length, P being an integer greater than or equal to one, and the actual length L (mm) of the reference scale on the negative.

The photographic magnification X is calculated as follows by the photographic magnification calculation unit 100 according to the rangefinder result for the subject distance D (mm) and the focal length f (mm) of zoom lens 42 (FIG. 15) using the following equation (1):

$$X = f/D \qquad \text{Eq. (1)}$$

The data shown in FIG. 7 is stored beforehand in a CPU of the control circuit 6. The CPU includes a random access memory (RAM) and a read-only-memory (ROM). The control circuit 6 looks up data corresponding to the photographic magnification X calculated according to equation (1), reads out the units of the basic scale, the scale length L (mm), and the number of light timing pulses P, and controls the LED drive circuit 9 to imprint the film. If P light timing pulses are generated per unit length of the negative and are synchronized with the pulses generated by the encoder arranged on the free sprocket rod 85 (FIG. 21), the LEDs light up, accompanying the forwarding of the film, according to the number of light timing pulses P, as shown in FIG. 7, stored in the RAM in the CPU. The reference scale length L is then automatically imprinted.

Figure 8:
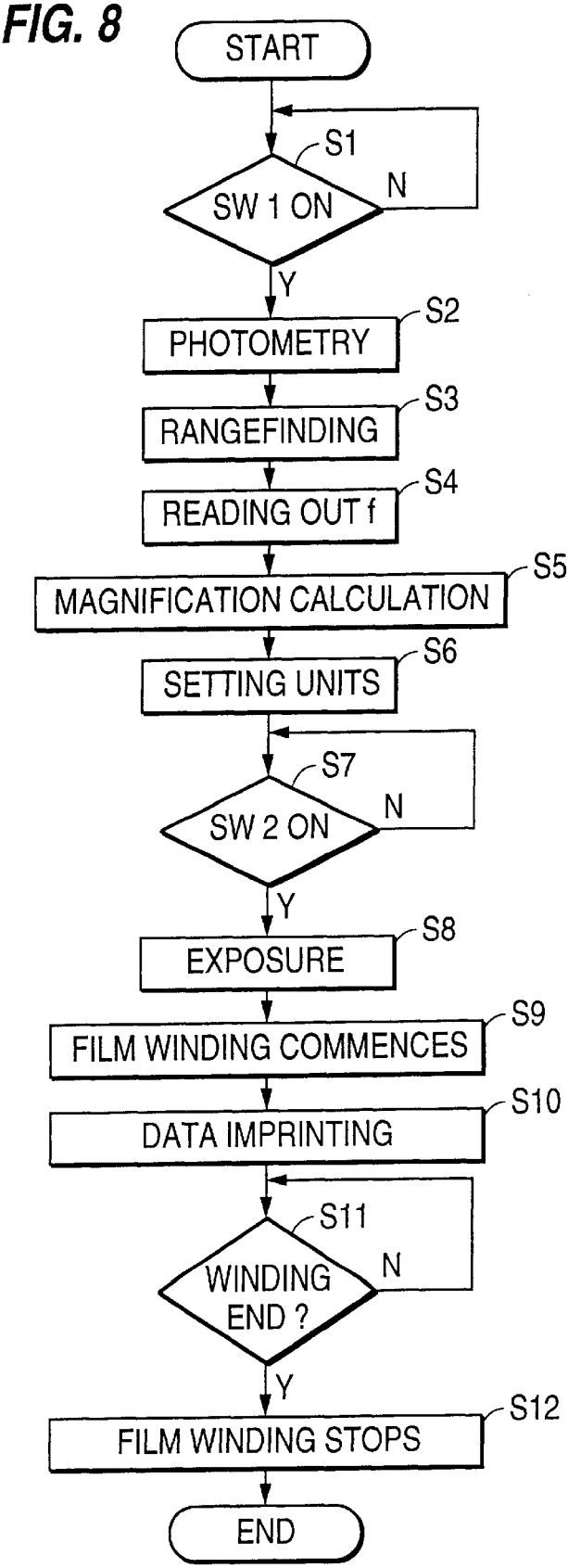
FIG. 8 is a flow chart explaining the imprinting of the reference scale onto the film according to the present invention.

FIG. 8 is a flow chart of a control program executed in a microcomputer in the control circuit 6. The operation of imprinting the reference scale will be explained with the aid of this flow chart.

Step S1 determines, in accordance with switch SW1, whether or not the release button (not shown) is half depressed. If the release button is half depressed, the program proceeds to step S2. Step S2 detects the subject brightness by means of the photometric device 3. Step S3 determines the subject distance D (mm) by means of the rangefinder device 4. Step S4 detects the focal length f (mm) of the zoom lens by means of the focal length detection device 5. Step S5 calculates the photographic magnification X by means of Equation (1) as set forth above. Then, step S6 looks up the data shown in FIG. 7 and stored in the memory of the control circuit 6, and the units, reference scale length L (mm), and light timing pulses P of the reference scale are read out in accordance with the photographic magnification X calculated in step S5.

Step S7 determines, by means of switch SW2, whether or not release of the release button (not shown) has occurred. If release has occurred, the program proceeds to step S8 where the film is exposed by controlling the exposure control circuit 10. After the exposure, step S9 controls the film forwarding motor drive circuit 7, and the film is wound. Step S10 controls the LED drive circuit 9 so that the reference scale units, reference scale and date of photography are imprinted in the imprinting region 13 of the photographic frame 12. Step S11 determines whether or not the film has been wound by one frame. If the film has been wound by one frame, the program advances to step S12, and the forwarding of the film (film feed) is stopped. In this manner, the reference scale is determined in accordance with the photographic magnification. Further, the units and scale graduation are superimposed and imprinted onto the film. Thus, the size of the subject can be easily estimated using the imprinted reference scale regardless of the magnification during photography and the print size.

Figure 9:
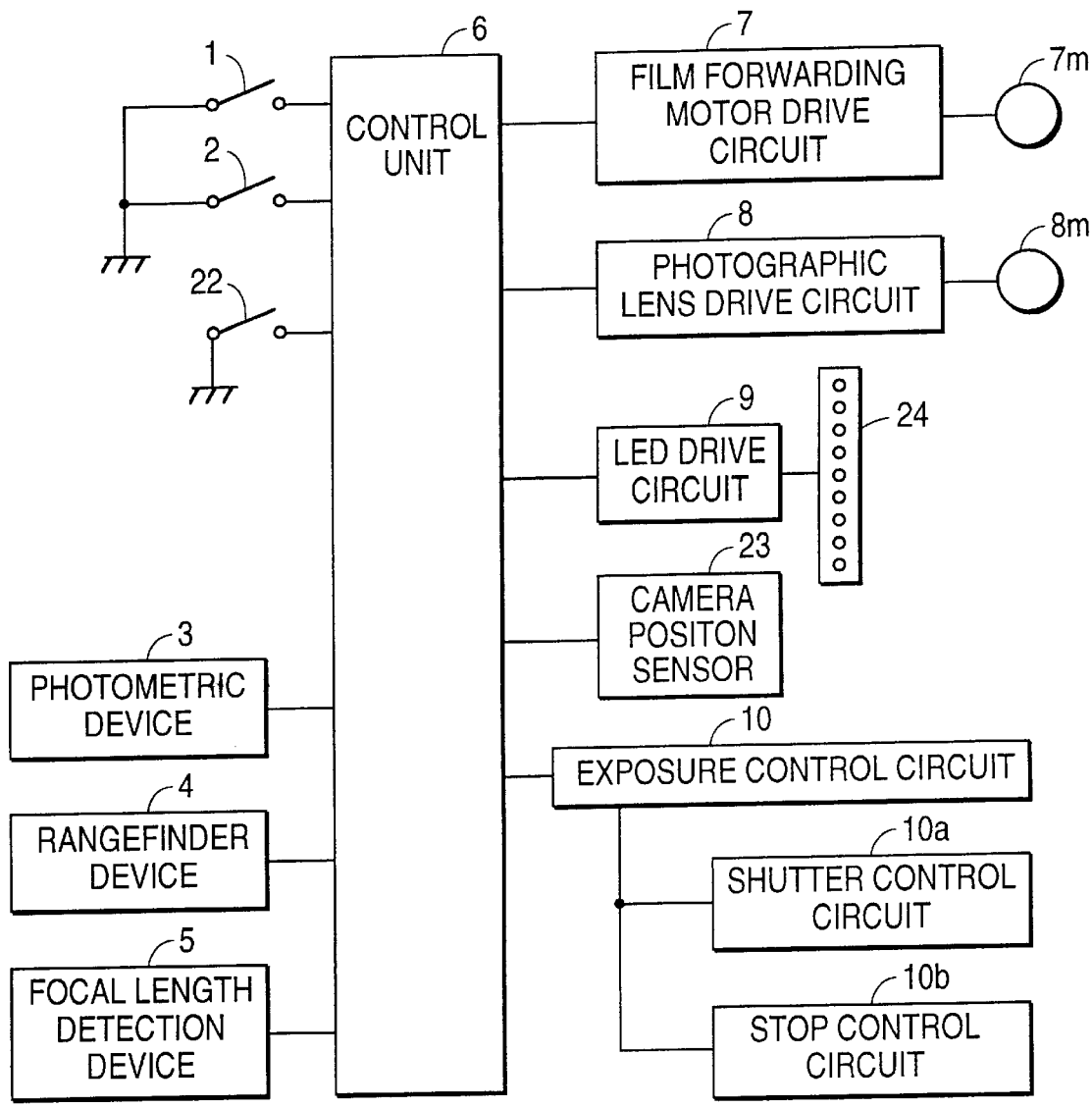
FIG. 9 is a basic block diagram of a circuit in a camera for imprinting a reference scale onto film according to a second embodiment of the present invention.
Figure 10A:
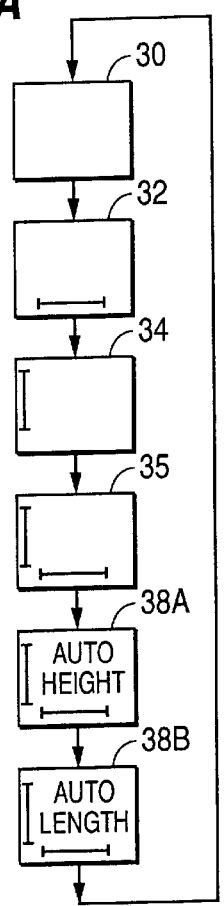
FIG. 10A is a diagram of various modes which are cyclically advanced by a selection switch according to the second embodiment of FIG. 9.

FIG. 9 is a basic block diagram of a circuit in a camera for imprinting a reference scale onto film according to a second embodiment of the present invention. The circuits in FIG. 9 are similar to those circuits shown in FIG. 2. The operation of the circuits in FIG. 9 also is substantially the same as that in the circuits in FIG. 2. The second embodiment of FIG. 9 additionally includes a mode selection switch 22 and a camera position sensor 23. The LED array 24 is a modified LED array. The mode selection switch 22 cyclically selects a mode as shown in FIG. 10A. That is, a mode is selected by continuously pressing the mode selection switch 22 which cyclically advances through the various modes shown in FIG. 10A including: a "no imprinting" mode 30 in which a reference scale is not imprinted onto the film, a horizontal reference scale imprinting mode 32 in which a horizontal reference scale is imprinted onto the film, a vertical reference scale imprinting mode 34 in which a vertical reference scale is imprinted onto the film, a horizontal and vertical reference scale mode 35 in which a horizontal reference scale and a vertical reference scale are imprinted onto the film, and an automatic imprinting mode 38A and 38B which automatically imprints either a horizontal reference scale or a vertical reference scale onto the film in accordance with the camera position detected by the camera position sensor 23. The camera position sensor 23 senses whether the camera is held horizontally or vertically and imprints the appropriate reference scale. That is, the position of the scale in a frame is changed in accordance with the output of the position sensor 23.

Figure 10B:
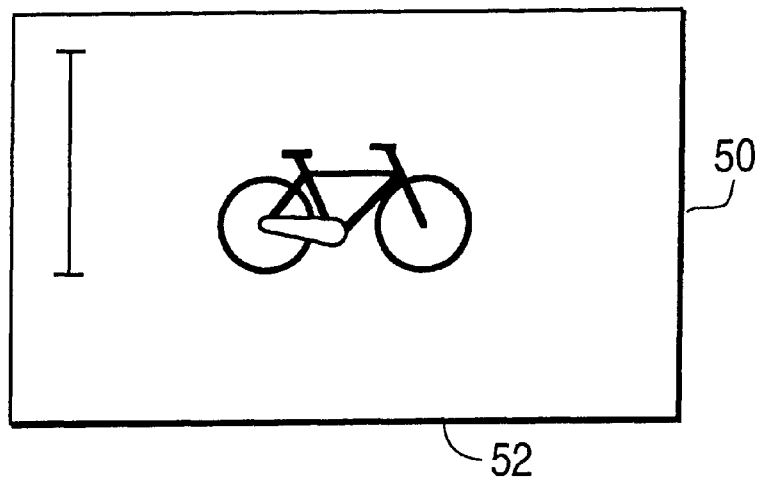
FIGS. 10B and 10C are diagrams showing the imprinting of a reference scale during an automatic height mode of FIG. 10A.
Figure 10C:
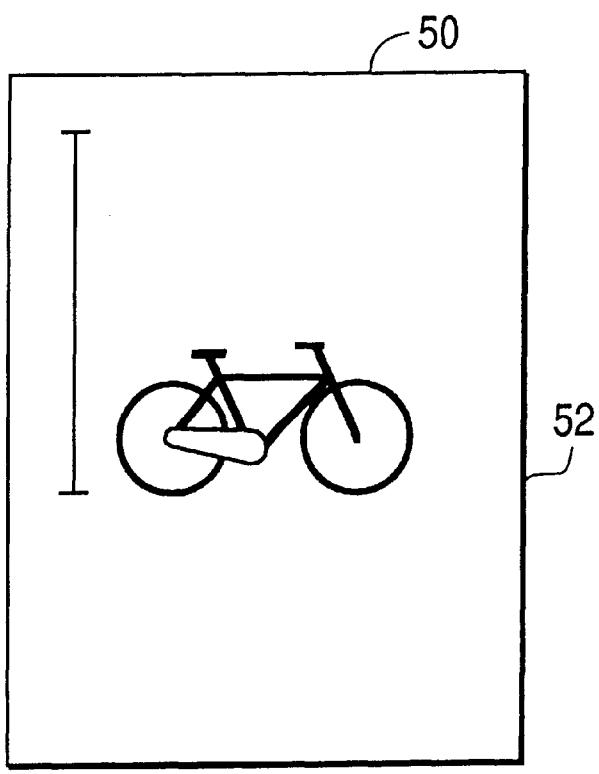

When the automatic imprinting mode is set to an automatic height imprinting mode 38A, and the camera is in a horizontal position as sensed by the position sensor 23, a reference scale is vertically imprinted along the short side 50 of the frame as shown in FIG. 10B. When the camera is in a vertical position as sensed by the position sensor 23, then a reference scale is vertically printed along the long side 52 of the frame as shown in FIG. 10C.

Figure 10D:
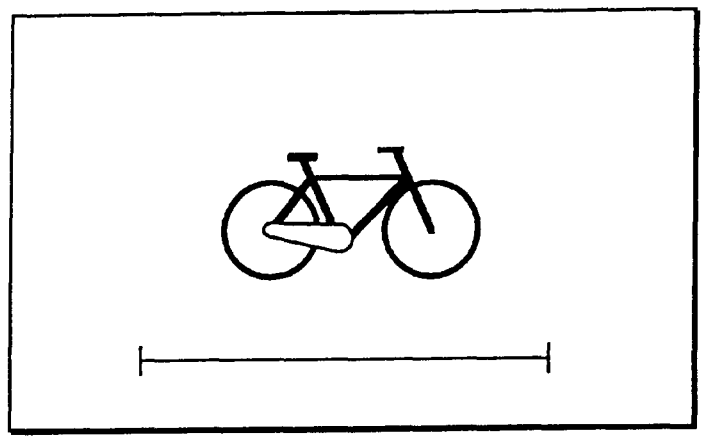
FIGS. 10D and 10E are diagrams showing the imprinting of a reference scale during an automatic length mode of FIG. 10B.
Figure 10E:
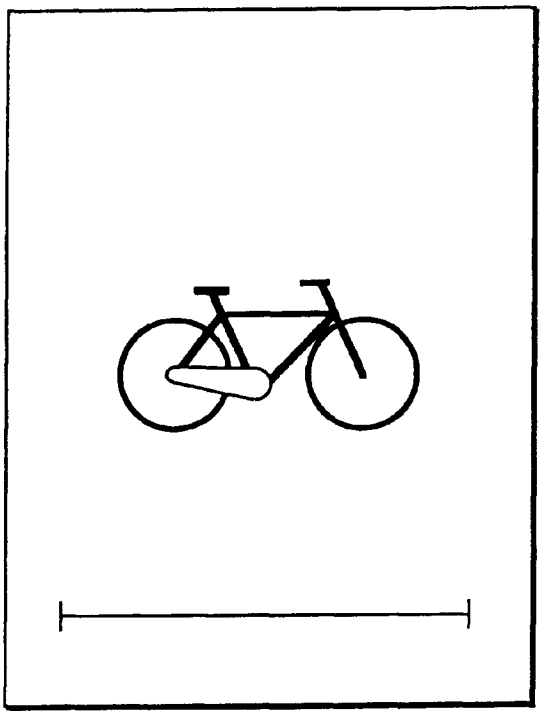

When the automatic imprinting mode is set to an automatic length imprinting mode 38B, and the camera is in a horizontal position as sensed by the position sensor 23, a reference scale is horizontally imprinted along the long side 52 of the frame as shown in FIG. 10D. When the camera is in a vertical position as sensed by the position sensor 23, a reference scale is horizontally imprinted along the short side 50 of the frame as shown in FIG. 10E.

Figure 11:
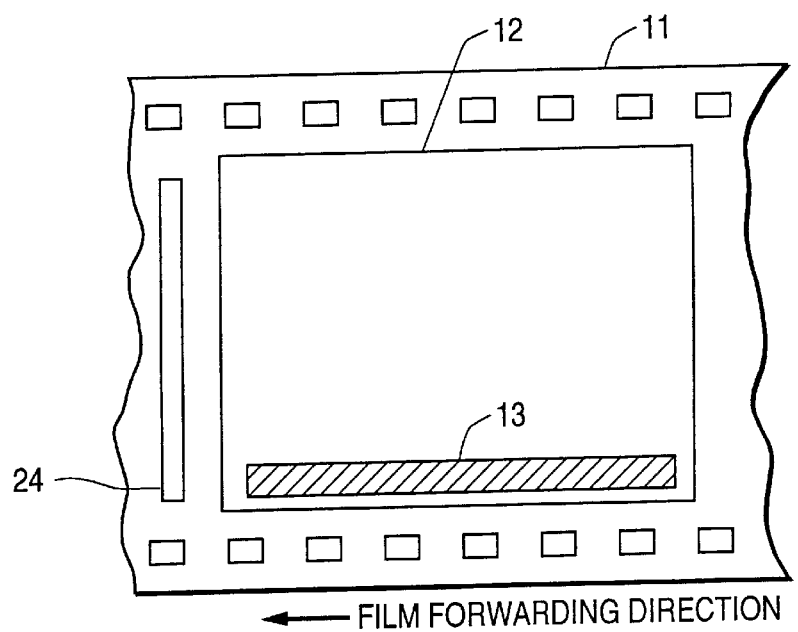
FIG. 11 is a diagram showing the positional relationship of a linear LED array with respect to the film according to the second embodiment of FIG. 9.

FIG. 11 is a diagram showing the positional relationship of the modified linear LED array 24 with respect to the film 11 according to the second embodiment of the present invention. The linear LED array 24 extends along the width of the film in this embodiment and allows a horizontal or vertical reference scale or a horizontal and vertical reference scale to be imprinted onto the film in accordance with one of the selected modes shown in FIG. 10A. The linear LED array 24 is formed with, for example, at least 80 LEDs. The more LEDs employed, the better the quality and clarity of the imprinted characters on the film.

Figure 12:
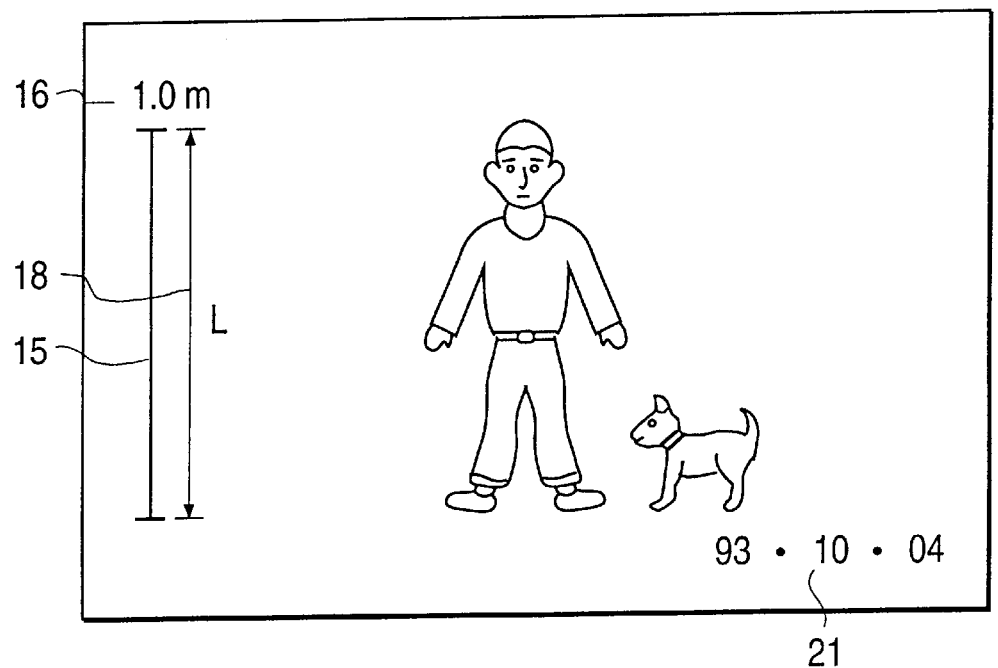
FIG. 12 is a reference scale imprinted vertically on the film according to the second embodiment of FIG. 9.
Figure 13:
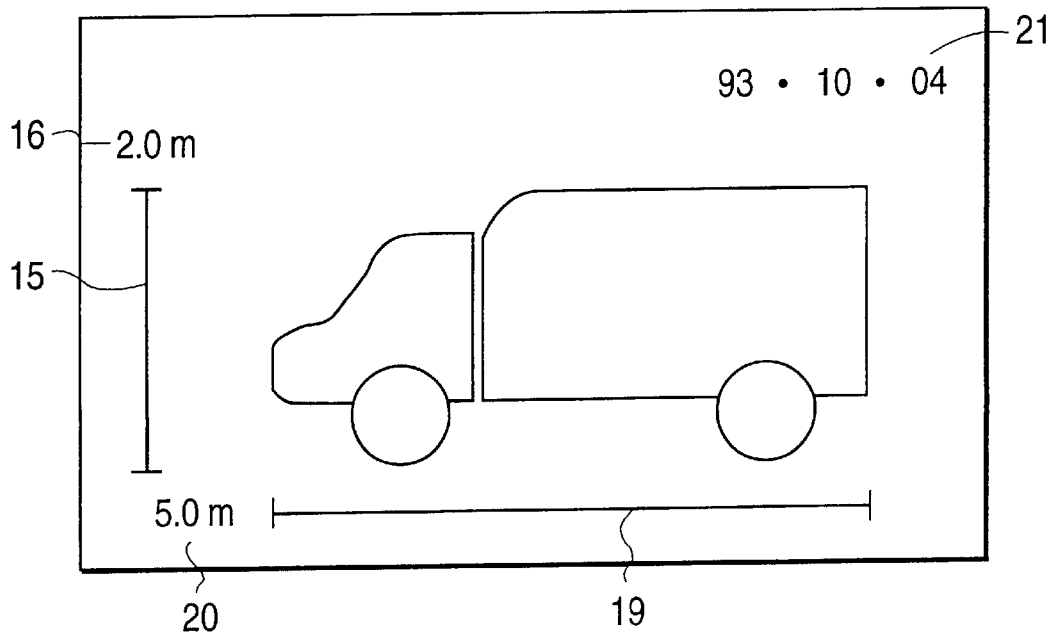
FIG. 13 is a reference scale imprinted both vertically and horizontally onto the film according to the second embodiment of FIG. 9.

FIGS. 12 and 13 are examples of the various modes in which the reference scale can be imprinted according to the second embodiment of the invention shown in FIGS. 9–11. FIG. 12 is a reference scale vertically imprinted on the film when the camera is in a vertical imprinting mode 34 or an automatic printing mode 38A or 38B. FIG. 13 shows a reference scale horizontally and vertically imprinted onto the film when the camera is in a vertical and horizontal imprinting mode 35. As shown, the date 21, reference scale units 16 and 20, scale graduations 15 and 19 and any additional information can be printed anywhere on the film due to the length and location of the linear LED array 24 and the frame position controller in the control circuit 6 (72).

Figure 14:
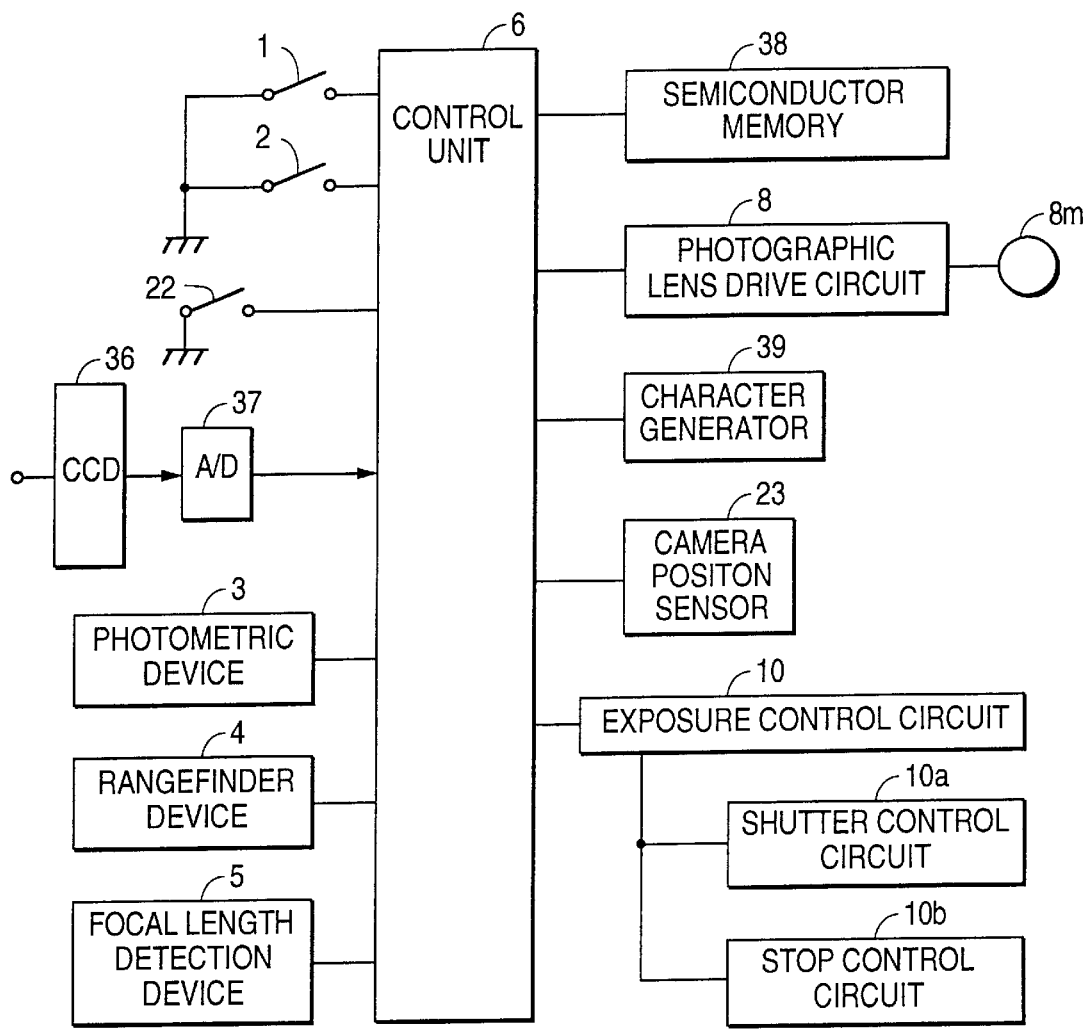
FIG. 14 is a block diagram of a circuit in a camera for imprinting a reference scale onto memory storage media according to a third embodiment of the present invention.

FIG. 14 is a block diagram of a circuit in a camera for inputting a reference scale onto memory storage media according to a third embodiment of the present invention. FIG. 14 is similar to FIG. 9 except that a charge-coupled device CCD 36 receives an image from a lens (not shown) and changes the image into an electrical (video) signal. The electrical signal is an analog signal and is input to an A/D converter 37 to convert it to a digital signal for input to a semiconductor memory 38 via the RAM in the control unit 6. A character generator 39 generates data and/or a scale to be electrically imprinted onto memory storage media. The data and/or scale is temporarily stored in the RAM in the control unit 6. The semiconductor memory 38 can be any type of memory, such as a RAM, but is not limited thereto. The semiconductor memory 38 receives the digital signal from the A/D converter 37 and a signal from the character generator 39 and imprints the memory storage media. The control unit 6 includes a frame position controller (not shown) for controlling where the semiconductor memory imprints data and/or a scale on a frame. The character generator 39 is provided in place of the LED drive circuit 9 and LED array 9a in FIG. 2 or LED array 24 in FIG. 9.

In the third embodiment shown in FIG. 14, memory storage media is electrically imprinted. Memory storage media is electrically imprinted using, for example, two basic well-known methods. In one method for electrically imprinting, a RAM in a CPU in the control circuit 6 receives data from the character generator 39 and the CCD 36 and combines the data. Where scale data is to be imprinted in accordance with the character generator 39, no image data from the CCD 36 is present and vice versa. The data is then input to the semiconductor memory 38 and the memory media image is imprinted. In another method, the semiconductor memory includes an image data storage area, scale (and other data) storage area and a position storage area. The position storage area determines where on the memory storage media the scale and other data are to be imprinted. The data is then output to an electronic device, such as a television. A switch determines whether only image data or image and scale (or other) data are to be imprinted. The embodiments of the present invention, however, are not limited to these two methods. These methods are given as examples. Other methods can be employed.

Figure 15:
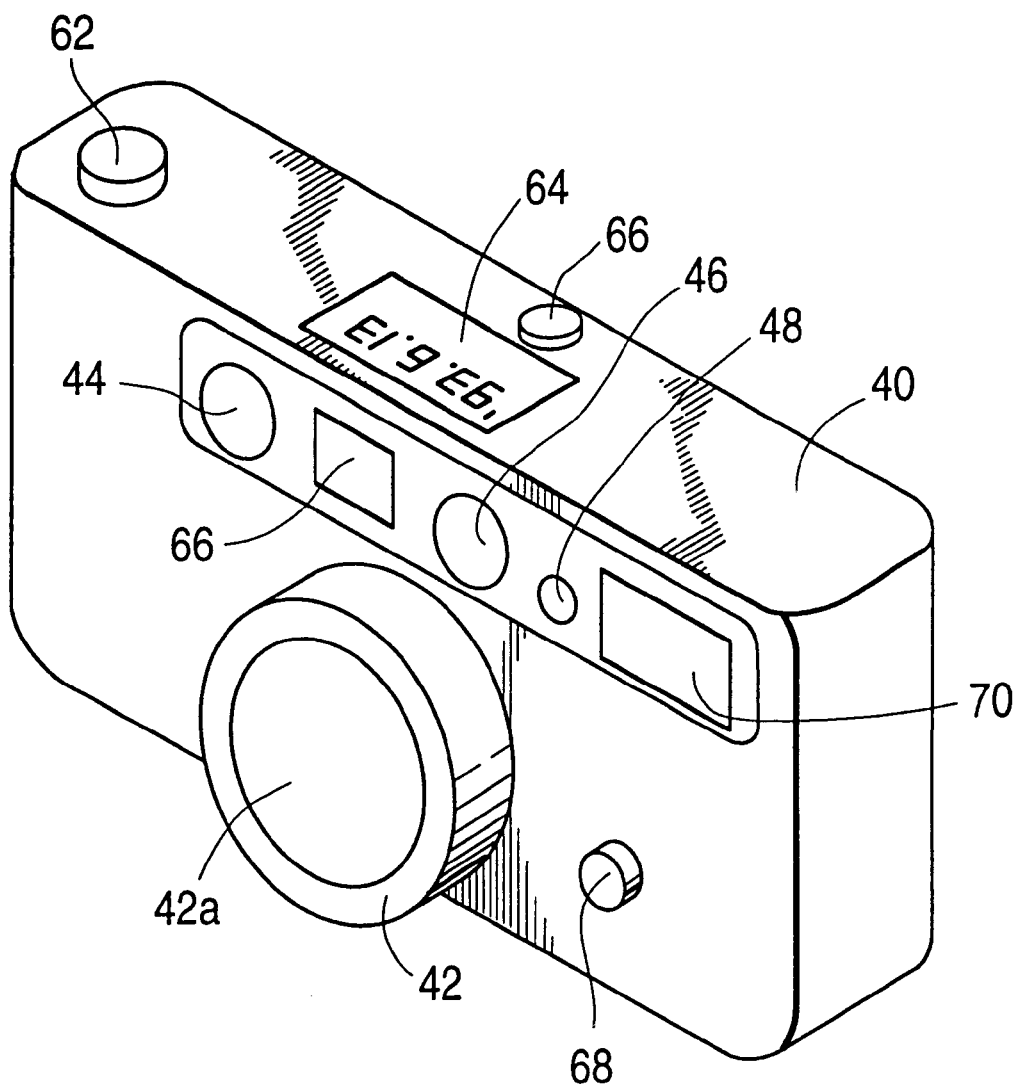
FIG. 15 is an angular view of a camera body according to a fourth embodiment of the present invention.

FIG. 15 is an angular view of a camera body according to a fourth embodiment of the present invention. In FIG. 15, a camera body 40 includes a zoom lens barrel 42, which can extend or retract, and is positioned in the direction of an optical axis of a picture taking lens 42a on the front of the camera body 40. A light emitter 44, a photoreceptor 46, an exposure meter 48 and a viewfinder 60 are positioned above the zoom lens barrel 42. The light emitter 44 emits infrared light in the direction of a subject. The photoreceptor 46 receives the infrared light emitted by the light emitter 44 and reflected by the subject. The exposure meter 48 detects the subject brightness. A release button 62, a display 64 and a date mode selection button 66 are also positioned on the upper side of the camera body 40. The display 64 displays various data such as the date. The date mode selection button 66 selects whether or not the date is to be superimposed and imprinted onto the film. To the side of the zoom lens barrel 42 on the front side of the camera body 40 is a scale imprinting button 68 which selects whether or not to superimpose and imprint the reference scale. The scale imprinting button 68 returns to its original condition by, for example, the restricting force of a spring when a pressing operation of the scale imprinting button 68 is interrupted. A strobe 70 is also provided.

Figure 16:
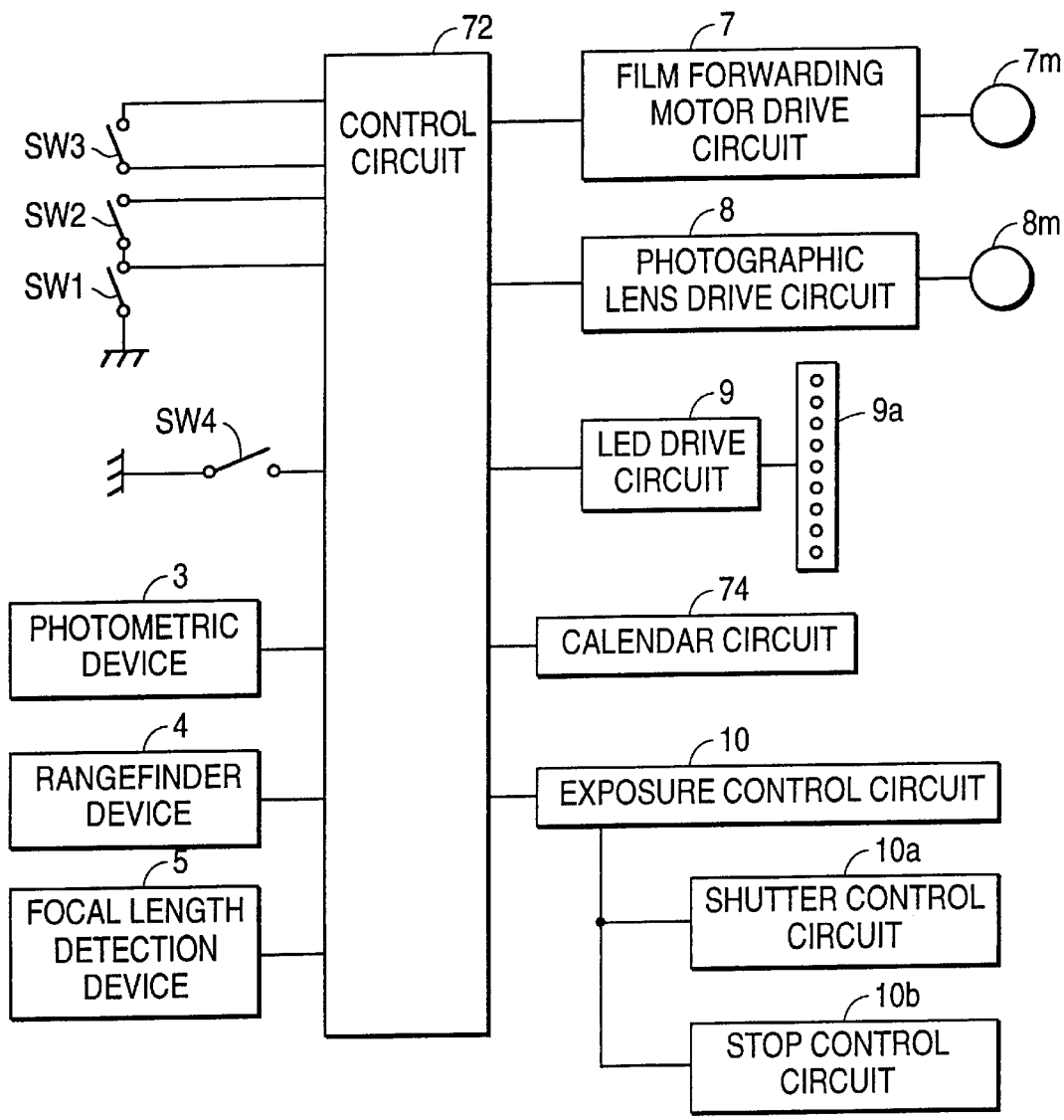
FIG. 16 is a block diagram of a camera according to the fourth embodiment of the present invention.

FIG. 16 is a block diagram of a circuit in a camera according to the fourth embodiment of the present invention and is similar to that shown in FIG. 14. Like reference numerals refer to like parts and an explanation is deleted. In FIG. 16, a control circuit 72 includes a microcomputer and its peripheral components. As in FIG. 14, connected to the control circuit 72 are switches SW1 and SW2 which correspond to switches 1 and 2 in FIG. 14. SW1 is turned on when the release button is pressed halfway. SW2 is turned on when the release button 62 is fully pressed. The photometric device 3 detects the subject brightness by means of the exposure meter 48. The range finding device 4 detects the subject distance D(mm) based on the infrared light receiving mode of the photoreceptor 46. A film forwarding motor drive circuit 7, as shown in FIG. 2, is also provided to drive the film feed motor 7m based on signals from the control circuit 72. The photographic lens drive circuit 8 drives the lens motor 8m based on control signals from the control circuit 72. The LED circuit 9 drives the LED array 9a, which in this case includes nine individual LEDs which superimpose and imprint such data as the reference scale and the date stored in the memory of the control circuit 72. The exposure control circuit 10 controls the shutter control circuit 10a and the stop control circuit 10b. The operation of the LED array 9a for imprinting data is the same as set forth above with respect to FIGS. 2 and 15. Therefore an explanation is omitted.

Also connected to the control circuit 72 are switch SW3, switch SW4 and a calendar circuit 74. The switch SW3 becomes ON when the scale imprinting button 68 (shown in FIG. 15) is depressed. The switch SW4 becomes ON when the date mode selection button 66 is depressed halfway.

Each time the switch SW4 is turned ON, the date mode is alternately turned ON and OFF inside the calendar circuit 74. When the data mode is ON, date data is output from the calendar circuit 74 to the control circuit 72. When the date mode is OFF, date data from the calendar circuit 74 to the control circuit 72 is cancelled.

Figure 17:
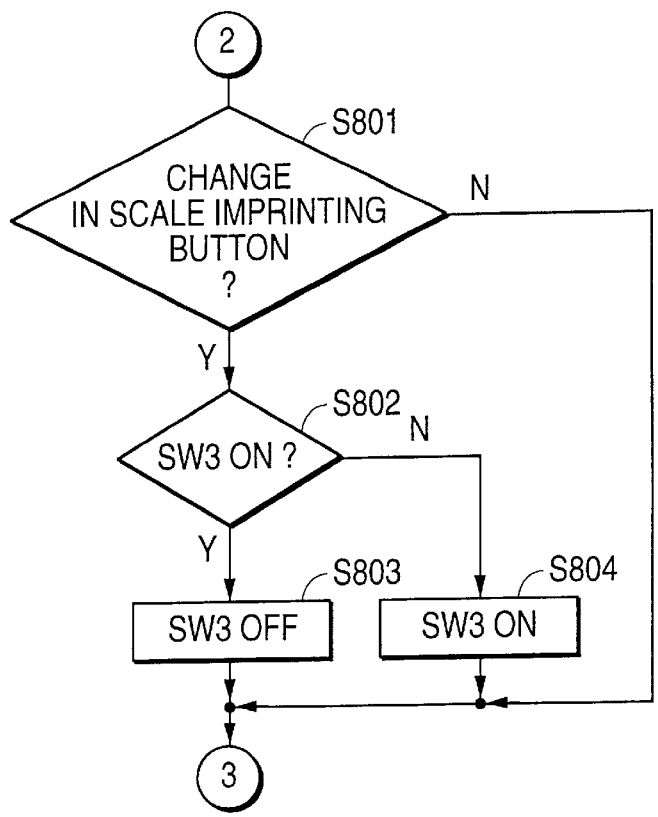
FIG. 17 is a flow chart of a control program which determines whether there is a change in status of a scale imprinting button according to the fourth embodiment of the present invention.
Figure 18:
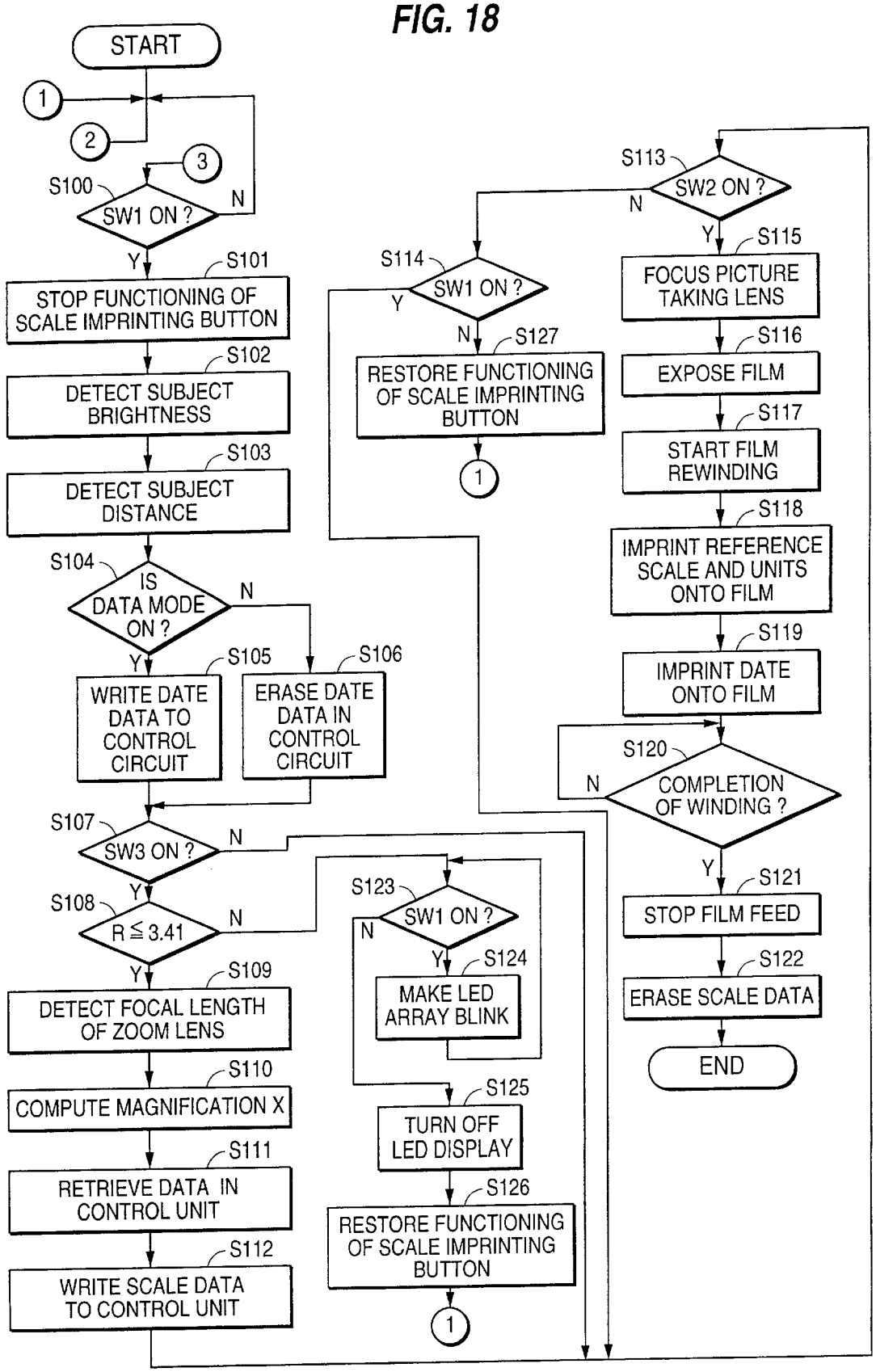
FIG. 18 is a flow chart of a control program according to the fourth embodiment of the present invention.

FIGS. 17 and 18 are flow charts for explaining the control program executed by the microcomputer of the control circuit 72 in FIGS. 16 and 21.

Step S801 in FIG. 17 determines whether there has been a change in status of the scale imprinting button 68. If there has been a change, the program proceeds to step S802. If there has not been a change, the program proceeds to step S100 in FIG. 18.

Step S803 determines whether the switch SW3 is ON. If so, the program proceeds to step S100 in FIG. 18.

Step S100 in FIG. 18 determines whether the release button 62 has been depressed halfway by switch SW1. If so, the program proceeds to step S101.

Step S101 stops the functioning of the scale imprinting button 68. That is, the ON/OFF condition of switch SW3 does not change even if the scale imprinting button 68 is depressed.

Step S102 detects the subject brightness by the photometric device 3. Step S103 detects the subject distance D(mm) by the rangefinder device 4. Stop S104 determines whether a date mode is ON in accordance with date data output from the calendar circuit 74. If the date mode is ON step S105 writes the date data from the calendar circuit 74 to the memory of the control circuit 72. If the date mode is OFF, step S106 erases the date data in the memory of the control circuit 72.

Figure 22:
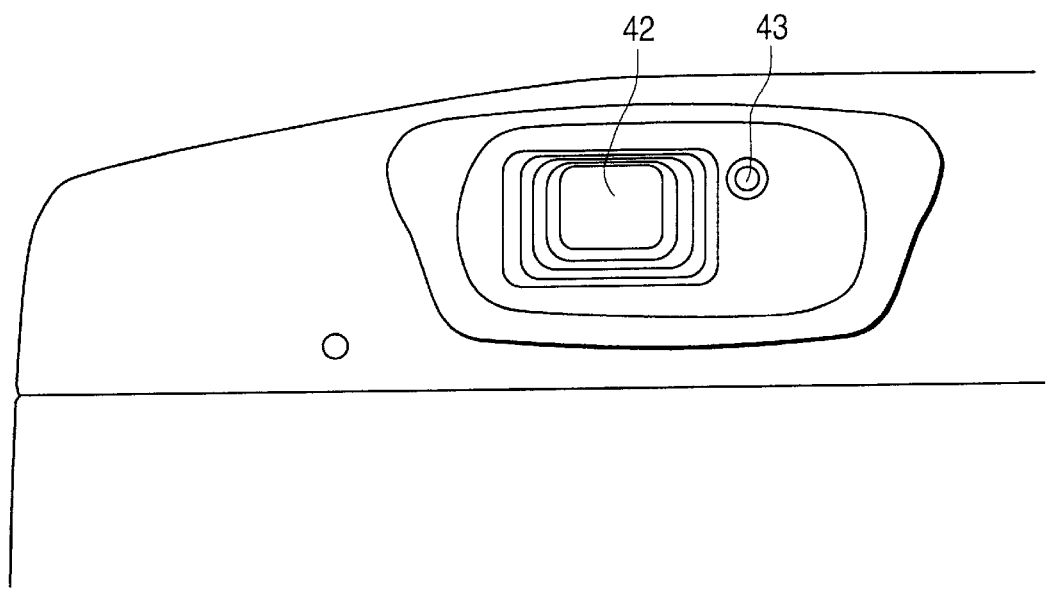
FIG. 22 is a rear view of a camera body including a zoom lens barrel and display LED according to an embodiment of the present invention.

Step S107 determines whether the switch SW3 is ON. If not, the program proceeds to S113. Is so, the program proceeds to step S108. Step S108 determines whether a next rangefinding value R is closer than 3.41 m and if so, the program proceeds to step S109. When the rangefinding value R is greater than 3.41 m, the program proceeds to step S123. Step S123 determines whether the half-depressed switch SW1 is ON or OFF. If it is OFF, the program proceeds to S124. Step S124 makes the display LED 86 in FIG. 22 blink and operation of the program returns to step S123.

When switch SW1 is ON, steps S123 and S124 are repeated and a release lock mode results. When S123 determines that the switch SW1 is OFF, the program proceeds to step S125 which turns OFF the display LED 43 in FIG. 22.

Step S126 restores the functioning of the scale imprinting button 68 which was stopped in step S101 and the program returns to step S100.

Step S109 detects the focal length f(mm) of the zoom lens 42 by the focal length detection device 5. Step S110 calculates the magnification X using Equation (1) set forth hereinabove. Step S111 retrieves the data stored in the memory of the control circuit 72 and the reference scale units, reference scale length L(mm) and the number of light timing pulses which correspond to the magnification X are read.

Step S112 writes the reference scale units and the number of light timing pulses to the memory of the control circuit 50 as scale data.

Step S113 determines whether the switch SW2 has been released. If so, the program proceeds to step S115. Step S115 controls the photographic lens drive circuit 8 (FIG. 2) to focus the lens on the subject based on the rangefinding results of step S103. Step S116 controls the exposure control unit 10 to perform film exposure. Step S117 controls the film forwarding motor dive circuit 7 to start film winding after exposure. Step S1 18 controls the LED drive circuit 9 to superimpose and imprint the units of the reference scale and the reference scale itself in the imprinting region 13 of the photographed frame 12 based on the scale data written to the memory of the control circuit 72. If the scale date has been erased in step S108, the LED drive circuit 9 does not operate.

Step S119 controls the LED drive circuit 9 to superimpose and imprint the data after superimposing and imprinting the scale data into the imprinting region 13 of the photographed frame 12 based on the date data written into the memory of the control circuit 72. If the date data has been erased in step S106, the LED drive circuit 9 does not operate.

Step S120 determines whether the winding of a single frame has been completed. If so, the program proceeds to step S121. Step S121 stops the film feed. Step S122 erases the scale data. The program is then completed.

If there is no release of the switch SW2 during step S113, the program proceeds to step S114. Step S114 determines whether the half-pressing of the release button 62 continues by way of switch SW1. If the half-pressing operation is continuing, the program returns to step S113. When the half-pressing operation of the release button 62 is cancelled, the program proceeds to step S127.

Step S127 restores the functioning of the scale imprinting button 68 which was stopped in step S101. The program then returns to step S100.

In this embodiment of the present invention, the period during which it is possible to change the ON/OFF condition of switch SW3 by means of the scale imprinting button 68 is available until the switch SW1 is turned ON, e.g., the release button 62 is depressed halfway. That is, after the release button 62 is depressed halfway, the setting before the half-pressing remains even if the scale imprinting button 68 is pressed. Thus, the condition in which the imprinting of the scale is performed or not performed does not change even if the scale imprinting button 68 is inadvertently depressed after the half pressing of the release button 62. Further, switch SW3 is configured to be ON when the scale imprinting button 68 is depressed and is OFF when the scale imprinting button 68 is depressed again. However, switch SW3 may be configured to be ON during the time the scale imprinting is performed. That is, the resulting mode is one in which scale imprinting is performed only when the release button 62 is depressed halfway while the scale imprinting button 68 is depressed.

FIG. 19 is a table for selecting reference scale units using a rangefinding value according to a focal length of the picture taking lens 42a (FIG. 15). The data in FIG. 19 is stored in advance in the memory of the control circuit 6 (72). Data is retrieved with each photograph to determine the units. A scale length which conforms to the units along with a magnification is obtained from the rangefinding value and the focal length of the picture taking lens. The scale length is computed and the number of imprinting pulses is computed from the movement generating pulses per specified amount of film movement. The reference scale length L can be automatically superimposed and imprinted by the lighting of the LED in synchronization with the pulses generated by the encoder positioned on a free sprocket. Thus, the reference scale is set according to magnification and the units and scale graduation are superimposed and imprinted on the film. Therefore, the size of the subject can be easily estimated using the imprinted reference scale regardless of the magnification during photography and the print size.

Figure 20:
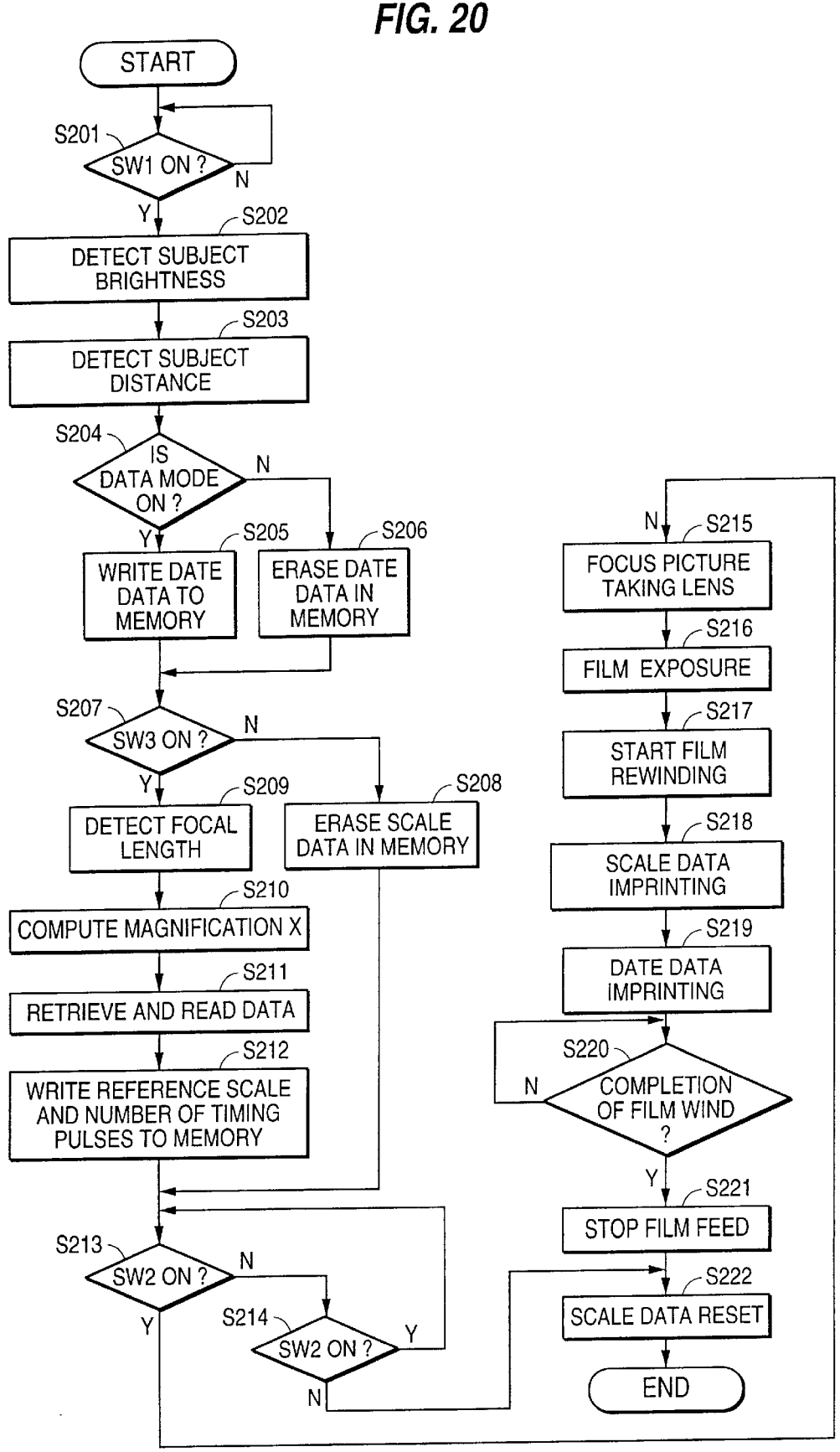
FIG. 20 is a flow chart of a control program according to a fifth embodiment of the present invention.

FIG. 20 is a flow chart of a control program according to a fifth embodiment of the present invention executed by the microcomputer of the control circuit 72 for explaining the reference scale superimposing and imprinting operation. Step S201 determines whether the release button 62 has been depressed halfway by means of switch SW1. If it has, then the operation proceeds to step S202. Step S202 detects the brightness of the photometric device 3. Step S203 detects the subject distance D(mm) by the rangefinding device 4. Step S204 then determines whether the date mode is ON according to whether there is date data output from the calendar count 74. If the date mode is ON then the operation proceeds to step S205. In step S205, the date data is written to the memory of the control circuit 72. If the date mode is OFF, then the operation proceeds to step S206. In step S205, the date data in the memory of the control circuit 72 is erased. Step S207 then determines whether the scale imprinting button 68 is depressed by means of a switch SW3. Step S208 erases the scale data written into the memory of the control circuit 72 if the scale imprinting button 68 has been depressed. Then the operation proceeds to step S213. If the scale imprinting button 68 is not depressed the operation proceeds to step S209.

Step S209 detects the focal length f(mm) of the zoom lens by the focal length detection device 5 (FIG. 2). Step S210 computes the magnification X by the above-mentioned equation (1). Step S211 retrieves the data stored in the memory of the control unit 72 (and shown in FIG. 7) and reads the reference scale units, scale length L(mm) and number of pulses which correspond to the magnification X. Step S212 writes the reference scale units and the number of light timing pulses to the memory of the control circuit 72 as scale data.

Step S213 determines whether the switch SW2 has ben released. If so, the operation proceeds to step S215 which controls the photographic lens drive circuit 8 to focus the picture taking lens on the subject based on the range finding results from step S203.

Step S216 controls the exposure control circuit 10 to perform film exposure. Step S217 controls the film forwarding motor drive circuit 7 to start film winding after exposure. Step S218 controls the LED drive circuit 9 to superimpose and imprint the units of the reference scale and the reference scale in the imprinting region 13 of the photographed frame 12 based on the scale data written to the memory of the control circuit 72. At this time, if the scale data is erased in step S208, the LED drive count 9 does not operate. Next, step S219 controls the LED drive circuit 9 to superimpose and imprint the date after imprinting the scale data onto the imprinting region 13 of the photographed frame 12 based on date data written to the memory of the control circuit 72. At this time, if the data has been erased in step S206, the LED drive circuit 9 does not operate.

Step S220 determines whether the winding of a single frame has been completed. If it has, step S221 stops film feed. Step S222 erases the scale data and the program is completed.

If there is no release of switch SW2 in step S213, the program proceeds to step S214. Step S214 determines whether the release button 62 continues to be depressed halfway by switch SW1. If the half depression operation continues, the program returns to step S213. If the half depression operation is cancelled, the program continues to step S222.

Therefore, in this embodiment of the present invention, the scale is not superimposed and printed when the scale imprinting button 68 is not depressed. Therefore, the reference scale is only superimposed and imprinted when it is needed. When the reference scale is not needed, for example, if photographing scenery, the superimposing and imprinting can be cancelled to prevent loss of or detraction from scenic beauty. There is also no danger of the reference scale being superimposed and imprinted as long as the photographer does not consciously decide to superimpose and imprint the reference scale by operating the scale imprinting button 68 during the depressing of the release button 62. These operations are not essential to the embodiments of the present invention. Instead, a release switch may be used, rather than the scale imprinting button 68, to select a superimposing and imprinting mode and a superimposing and imprinting suppression mode.

The reference scale units, reference scale length, number of pulses, and actual length on the negative with respect to the magnification X are not limited to the above-mentioned embodiments. Also, the type of reference scale and number of LEDs for superimposing and imprinting the reference scale and characters are not limited to the above-mentioned embodiments.

In the above embodiments, the control circuit 6 shown in FIGS. 2, 9 and 14 and step S5 of the control program shown in FIG. 8, and the control circuit 72 and step S210 of the control program shown in FIG. 20 form the photographic magnification calculation unit 100 shown in FIGS. 1A and 1B. The control circuit 6 of FIGS. 2, 9 and 14 and step S6 of the control program shown in FIG. 8, and the control circuit 72 and step S211 of the control program shown in FIG. 20 form the reference scale setting unit 101 shown in FIGS. 1A and 1B. The character generation unit 39 and the semiconductor memory 38 shown in FIG. 14, the LED drive circuit 9 and the LED array 9a of FIG. 2 or FIG. 9 form the imprinting unit 102 shown in FIGS. 1A and 1B. The scale imprinting button 68 forms the selection unit 103 and control circuit 72 and step S208 of the control program shown in FIG. 20 form the suppression unit 104.

The scale units and scale graduations are imprinted on the memory storage media so that, regardless of the photographic magnification during photography or the print size, the size of the subject can easily be estimated by means of the imprinted reference scale. The scale units, reference scale, pulse number and actual length on the negative of the reference scale for the photographic magnification X are not limited by the above-mentioned embodiments which are used as examples. Additional information can be imprinted if desired, and the control circuit 6 (72) need only be modified accordingly. Further, the configuration or location of the reference scale is not limited by the above examples of the embodiments of the present invention. That is, the reference scale can have various configurations and can be located vertically or horizontally anywhere with respect to the memory storage media. In the embodiments of the present invention as described hereinabove, the reference scale is set in proportion to the photographic magnification. The size of the subject can easily be estimated, regardless of the photographic magnification at the time of photography or of the print size, by means of the reference scale imprinted on the memory storage media. However, the embodiments of the present invention are not limited thereto and can be applied to all cases of imprinting a reference scale onto memory storage media. Further, the above-described embodiments of the present invention cause lock release when the distance to the subject is above a specified distance, but may also be configured such that when a magnification is smaller than a specified value, lock release also occurs.

The above-described embodiments of the present invention allow a reference scale to be set according to a magnification and the reference scale is superimposed and imprinted onto the film so the size of the subject can be easily estimated using the superimposed reference scale regardless of the magnification during picture taking or print size. Further, the reference scale need only be superimposed and imprinted only when it is needed. Mistakes will not be discovered after picture taking is completed since picture taking will not be performed when it is not possible to accurately superimpose the reference scale. Also, the photographer can be informed of the reason picture taking cannot be performed or be given warning displays only when needed.

Although present preferred embodiments of the present invention have been shown and described, it will be appreciated by those skilled in the art that changes may be made in these embodiments, without departing from the principles and spirit of the invention, the scope of which is defined in the appended claims and their equivalents.

What is claimed is:

1. A camera which imprints at least one of a horizontal and a vertical reference scale on memory storage media, comprising:

a photographic magnification calculation unit for calculating a photographic magnification based on a subject distance;

a camera position sensor which senses the position of the camera;

a mode selection switch which selects at least one of the horizontal and vertical scales for imprinting on the memory storage medium;

a reference scale setting unit which sets the reference scale for estimating the size of a subject image on the memory storage media, in proportion to the photographic magnification calculated by said photographic magnification calculation unit;

an imprinting unit which imprints at least one of the horizontal and vertical reference scales on the memory storage media set by said reference scale setting unit and in accordance with said mode selection switch and said camera position sensor;

a rangefinder which rangefinds at plural focus detection areas within a photographic image surface, wherein a focus result of the subject distance is selected from among the plural focus detection areas; and a control unit that controls a picture taking operation, said control unit suppressing the picture taking operation in accordance with the calculated magnification from said photographic magnification calculation unit.

2. A camera according to claim 1, wherein said imprinting unit comprises a semiconductor memory.

3. A camera according to claim 2, wherein said reference scale setting unit comprises a character generator.

4. A camera according to claim 3, wherein said character generator generates one of or both data and a reference scale.

5. A camera according to claim 1, further comprising:

an analog-to-digital converter connected to said reference scale setting unit; and a charge-coupled device connected to said analog-to-digital converter.

6. A camera according to claim 1, wherein said camera is selected from the group consisting of video cameras and any electrically recordable camera.

7. A camera according to claim 1, wherein said memory storage media is selected from the group consisting of film, magnetic disc, magnetic tape and semiconductor memory.

8. A camera according to claim 1, wherein the reference scale comprises scale graduations and length units.

9. A camera according to claim 1, further comprising a control unit for controlling said photographic magnification calculation unit, said reference scale setting unit, and said imprinting unit.

10. A camera according to claim 1, further comprising:
   a mode selection switch; and
   camera position sensor for sensing the position of the camera.

11. A camera according to claim 10, wherein said mode selection switch cyclically selects various modes for imprinting the reference scale onto the memory storage media.

12. A camera according to claim 11, wherein said various modes include no mode, horizontal mode, vertical mode, a vertical mode, an automatic vertical mode, and an automatic horizontal mode.

13. A camera for imprinting a reference scale on a memory storage media, comprising:
   a photographic magnification calculation unit which calculates a photographic magnification based on a subject distance;
   a reference scale setting unit, operatively connected to said photographic magnification calculation unit, which sets a horizontal and a vertical reference scale for estimating the size of a subject image on the memory storage media, in proportion to the photographic magnification calculated by said photographic magnification calculation unit;
   an imprinting unit, operatively connected to said reference scale setting unit, which imprints one of the horizontal and vertical reference scale set by said reference scale setting unit on the memory storage media; and
   a control unit that controls the picture taking operation, said control unit suppressing the picture taking operation in accordance with the calculated magnification.

14. A camera according to claim 13, wherein the reference scale comprises scale graduations and length units.

15. A camera according to claim 13, further comprising a rangefinder unit for rangefinding at plural focus detection areas within a photographic image surface, wherein a focus result of the subject distance is selected from among the plural focus detection areas.

16. A camera according to claim 13, further comprising a control unit for controlling said photographic magnification calculation unit, said reference scale setting unit, and said imprinting unit.

17. A camera according to claim 13, wherein said imprinting unit comprises:
   an LED driver circuit; and
   an LED array, operatively connected to said LED driver circuit, for imprinting the reference scale onto the film.

18. A camera according to claim 17, wherein said LED array is a linear LED array.

19. A camera according to claim 18, wherein said linear LED array extends approximately the width of the film.

20. A camera according to claim 17, wherein said LED array imprints the reference scale onto the film parallel to the direction of forwarding the film.

21. A camera according to claim 17, wherein said LED array imprints the reference scale onto the film perpendicular to the direction of forwarding the film.

22. A camera according to claim 17, wherein said LED array imprints the reference scale onto the film parallel and perpendicular to the direction of forwarding the film.

23. A camera according to claim 1, further comprising:
   a selection unit for selecting whether or not to imprint the reference scale; and
   a suppression unit, connected to said selection unit, for suppressing the imprinting of the reference scale in accordance with said selection unit.

24. A camera according to claim 8, further comprising:
   a selection unit for selecting whether or not to imprint the reference scale; and
   a suppression unit, connected to said selecting unit, for suppressing the imprinting of the reference scale in accordance with said selection unit.

25. A camera according to claim 9, further comprising:
   a selection unit for selecting whether or not to imprint the reference scale; and
   a suppression unit, connected to said selection unit, for suppressing the imprinting of the reference scale in accordance with said selection unit.

26. A camera for imprinting a reference scale, comprising:
   a picture taking lens;
   a rangefinding unit for measuring a subject distance;
   a focal length detection unit for detecting the focal length of said picture taking lens;
   a photographic magnification calculation unit, operatively connected to said focal length detection unit, for calculating a magnification based on the subject distance and the focal length;
   a reference scale setting unit, operatively connected to said photographic magnification calculation unit, for setting the reference scale for estimating the size of a subject image on a memory storage media according to the magnification calculated by said photographic magnification calculation unit;
   an imprinting unit, operatively connected to said reference scale setting unit, for imprinting the reference scale onto the memory storage media by said reference scale setting unit;
   a control unit for controlling the picture taking operation, said control unit suppressing the picture taking operation in accordance with the calculated magnification from said photographic magnification calculation unit;
   a switch for operating said rangefinding unit; and
   a display for displaying warnings said control unit providing warning displays in accordance with a rangefinding value from said rangefinding unit when said switch is ON and stopping the warning displays when said switch is OFF.

27. A camera according to claim 26, wherein said control unit suppresses the picture taking operation in accordance with the subject distance.

28. A camera according to claim 27, wherein said control unit suppresses the picture taking operation when the subject distance is greater than a specified distance.

29. A camera according to claim 28, wherein said control unit suppresses the picture taking operation when the magnification is less then a specified value.

30. A camera according to claim 29, further comprising:
   a selection unit, connected to said switch, for determining whether or not to imprint the reference scale and for stopping a selection function when said switch is ON.

31. A method of taking a picture and selecting a reference scale comprising:
   calculating a photographic magnification based on a detected subject distance and a focal length of a lens;

selecting a standard scale unit and a standard length from a predefined table based on the photographic magnification; and suppressing a picture taking operation in accordance with the calculated magnification.

32. A camera for imprinting a reference scale on a memory storage media, comprising:

a photographic magnification calculation unit which calculates a photographic magnification based on a subject distance;

a reference scale setting unit, operatively connected to said photographic magnification calculation unit, which sets a horizontal and a vertical reference scale for estimating the size of a subject image on the memory storage media, in proportion to the photographic magnification calculated by said photographic magnification calculation unit;

an imprinting unit, operatively connected to said reference scale setting unit, which imprints one of the horizontal and vertical reference scale by said reference scale setting unit on the memory storage media; and a control unit that controls the picture taking operation, said control unit suppressing the scale imprinting operation in accordance with the calculated magnification.

33. A method of taking a picture and selecting a reference scale comprising:

calculating a photographic magnification based on a detected subject distance and a focal length of a lens;

selecting a standard scale unit and a standard length from a predefined table based on the photographic magnification; and suppressing a scale imprinting operation in accordance with the calculated magnification.

* * * * *